United States Patent
Chopra et al.

(10) Patent No.: US 11,791,873 B1
(45) Date of Patent: Oct. 17, 2023

(54) TERRESTRIAL INTERFERENCE CORRECTION USING SPATIAL BEAMFORMING TECHNOLOGY

(71) Applicant: Amazon Technologies, Inc., Seattle, WA (US)

(72) Inventors: Aditya Chopra, Austin, TX (US); Xiaoyi Wang, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,789

(22) Filed: Jun. 29, 2022

(51) Int. Cl.
  *H04W 16/14* (2009.01)
  *H04B 7/0456* (2017.01)

(52) U.S. Cl.
  CPC .................. *H04B 7/0456* (2013.01)

(58) Field of Classification Search
  CPC .... H04B 7/0617; H04B 7/024; H04B 17/309; H04B 17/318; H04B 7/0452; H04B 7/086; H04B 7/0456; H04W 16/14; H04W 52/242; H04W 16/20; H04W 24/08; H04W 84/06; H04W 24/04; H04W 56/001; H04L 25/0224; H04L 25/03343; H04L 1/0057; H04L 27/2646; H04L 2025/03414; H04L 2025/0377
  USPC ......................................................... 375/267
  See application file for complete search history.

(56) References Cited

U.S. PATENT DOCUMENTS

| | | | |
|---|---|---|---|
| 2009/0022088 A1* | 1/2009 | Wahlberg | H04B 7/18532 370/321 |
| 2018/0103381 A1* | 4/2018 | Ramamurthi | H04W 36/0016 |
| 2021/0389474 A1* | 12/2021 | Hamzeh | H04B 7/18517 |
| 2022/0247462 A1* | 8/2022 | Tobisu | H04B 7/0617 |
| 2023/0037629 A1* | 2/2023 | Brobston | H01Q 3/28 |

* cited by examiner

*Primary Examiner* — Eva Y Puente
(74) *Attorney, Agent, or Firm* — Lowenstein Sandler LLP

(57) ABSTRACT

Technologies directed to correction of terrestrial interference using spatial signal minimum beamforming are described. One method includes a first communication device with beamforming circuitry receiving an indication of a first direction. The method further includes determining that orienting a main lobe of a first antenna gain pattern along the first direction results in an RF interference condition. The method further includes determining a second antenna gain pattern. The second antenna gain pattern comprises a second main lobe oriented along the second direction. The method further includes determining a third antenna gain pattern of the beamforming circuitry using (i) the first antenna gain pattern and (ii) the second antenna gain pattern. The method further includes receiving a first RF signal with the beamforming circuitry configured with the third antenna gain pattern.

20 Claims, 12 Drawing Sheets

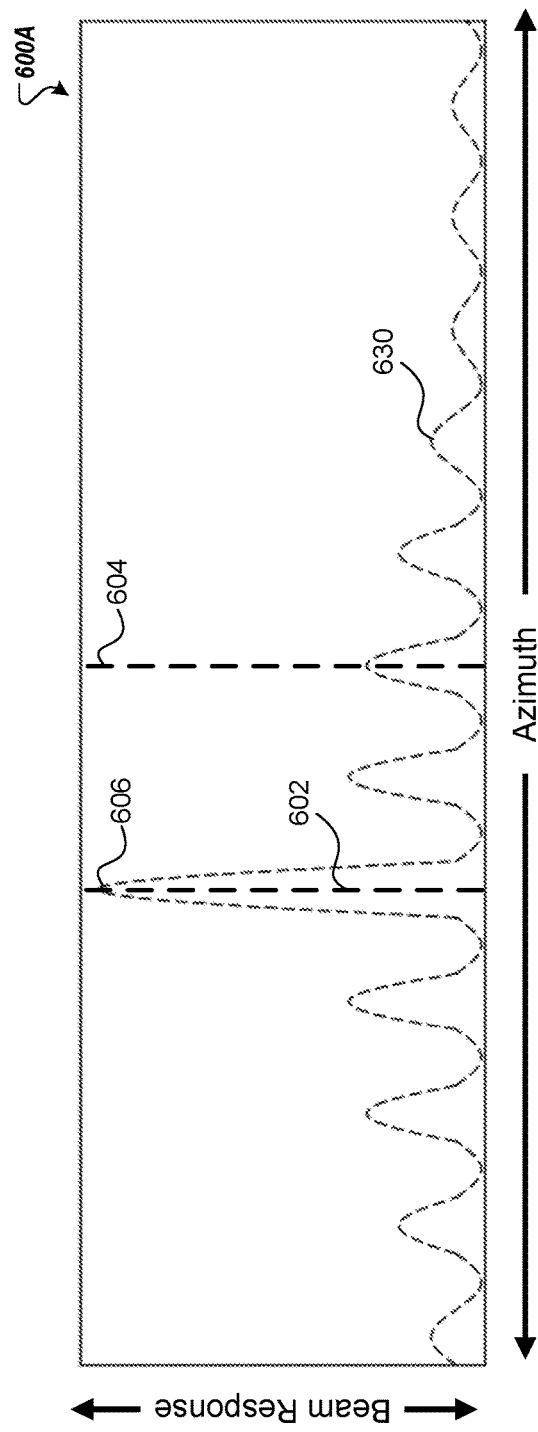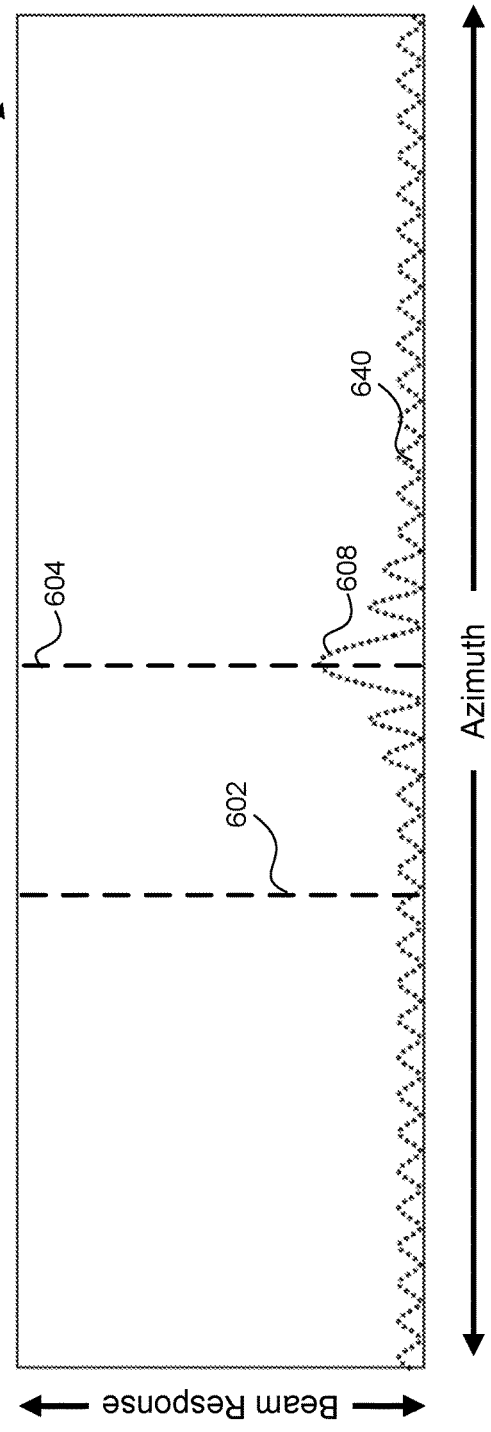

TERRESTRIAL INTERFERENCE CORRECTION USING SPATIAL BEAMFORMING TECHNOLOGY

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIGS. 6A-C depict graphs illustrating antenna gain patterns associated with spatial beamforming interference correction, according to embodiments of the present disclosure.

DETAILED DESCRIPTION

Figure 1:
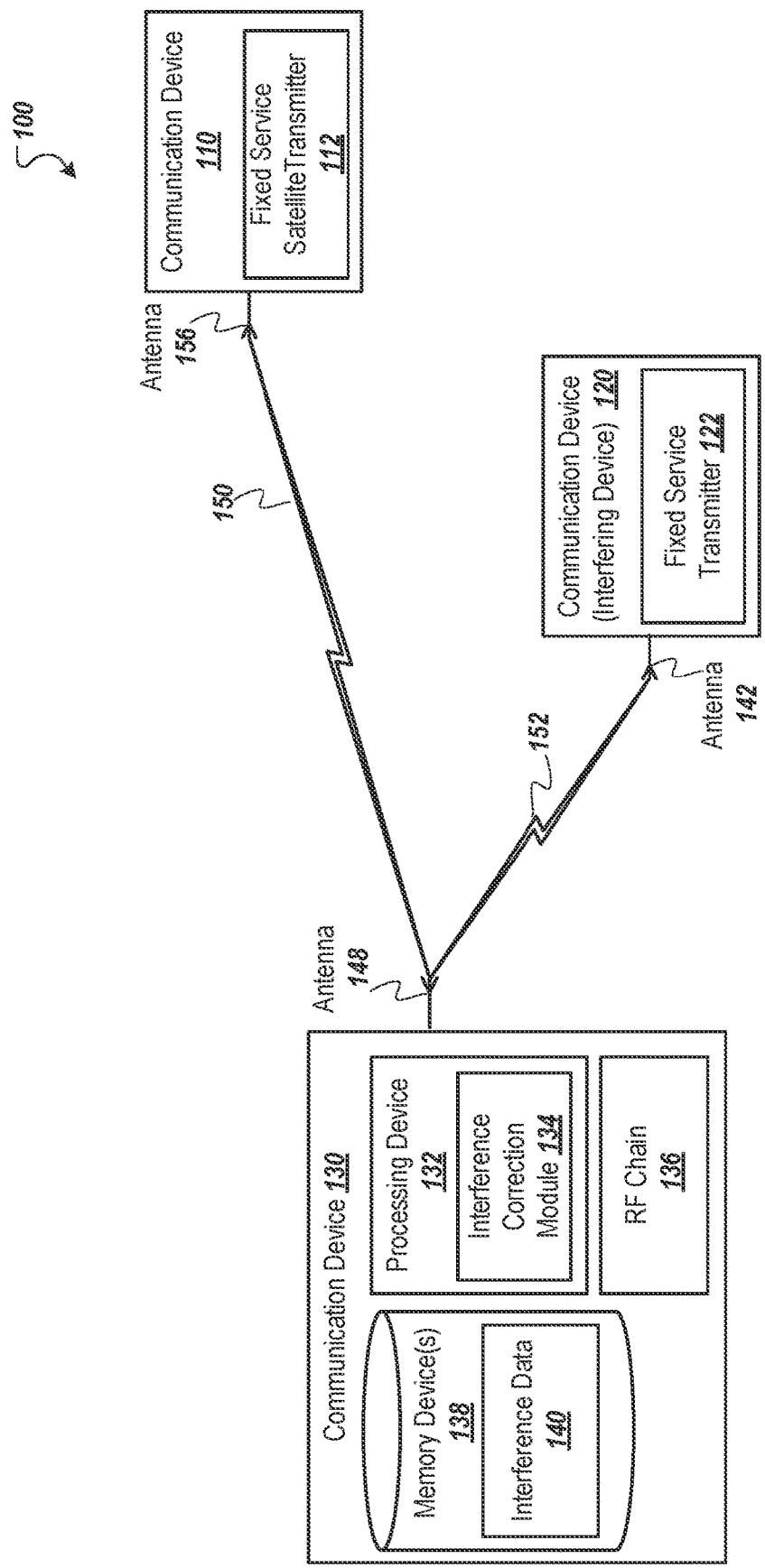
FIG. 1 is a block diagram of a communication system including a communication device with an interference correction module, according to embodiments of the present disclosure.

Technologies directed to canceling terrestrial interference using hybrid beamforming technology are described. Frequency bands 17.7-18.3 GHz, and 19.3-19.7 GHz are commonly shared by fixed service (e.g., Terrestrial) and fixed satellite communication. The Federal Communication Commission (FCC) has granted over 21,000 licenses for fixed service (FS) over the United States territory. The presence of many signals of various communicating entities using overlapping bandwidths across overlapping locations may result in signal interference. For example, communication channels may include a satellite user downlink (e.g., 17.8-18.2 GHz) and a gateway downlink (e.g., 19.3-20.2 GHz). These exemplary communication channels may experience channel interference from the many licensed fixed service communication devices.

Effects of fixed service interference with both user downlink bandwidths and gateway downlinks are experienced differently. Conventionally, gateway site planning typically selects a location free of terrestrial interference. Once the FCC grants a license to a satellite gateway, future operators seeking a license must avoid interfering with the satellite gateway. However, there is often limited professional site planning for customer terminals (CTs) in conventional methodologies. Later, fixed service operators do not need to protect existing CTs that often use a blanket license. The presence of fixed service operators can impose challenges to satellite downlink radio frequency (RF) receiving chains. Conventional satellite receiver designs include RF chains capable for handling noise-limited scenarios. Components of conventional RF chains often employ devices (e.g., low noise amplifiers (LNAs), analog-to-digital converters (ADCs), and automatic gain controllers (AGCs)) with relatively small dynamic ranges. Excessive terrestrial interference may demand a larger dynamic range, which, if resolved by employing different hardware components, can result in significantly increased cost.

Conventionally, fixed service interference can have a relatively large impact (e.g., exceeding receiver's dynamic range by several dBs). The interference can result in ADC saturation (e.g., the signal is processed outside an operational range of RF chain device (e.g., ADC)), poor signal resolution, and other shortcomings of RF communications. Cancelation of the terrestrial interference, at least in part, can improve the processing of a receive signal (e.g., by reducing the clipping of the ADC). Conventionally, interference cancellations such as spatial domain interference, Zero forcing, minimum mean square error (MMSE), and incremental related carriers (IRC) algorithm are used to minimize the impact of interference on signal-to-noise (SNR). However, all of these identified conventional techniques rely on an accurate channel estimation. For example, if the channel estimation is inaccurate, the cancellation effect may be sub-optimal.

Aspects of the present disclosure overcome the deficiencies of conventional interference corrections systems and methods. Often the fixed service interference arrival is typically around the horizon while the receive signal from the satellite arrives with a certain elevation angle above ground. Conventionally, a CT directs a receive beam (Rx) (in both analog and digital beamforming) towards a target device (e.g., an artificial satellite). The present disclosure includes forming a beam with a combination of a first main lobe directed at a target satellite and a second main lobe forming a pattern that maximizes signal reception in a target direction and minimizes signal reception along an interfering direction (e.g., a signal minimum oriented towards an interfering device). For example, a user terminal (UT) may attempt to estimate the direction and strength of fixed service interference. The UT may perform a beam sweep within a communication region. For each direction the main lobe of the beam is oriented (a direction the beam is pointing), the UT may determine signal strength (e.g., received signal strength indicator (RSSI)) of a corresponding RF signal. The UT may determine a direction of an interfering device by identifying the direction (e.g., elevation and azimuth angle) with the strongest RSSI (e.g., when a target device is not actively transmitting). The beamforming coefficients (e.g., phase shifts, amplitudes, etc.) of a beam directed towards the interference device may be recorded.

The UT may generate an interference correction coefficient map. The interference correction coefficient map includes directions and values (e.g., coefficients) for the stored. The UT performs a beam sweep within the communication region using a beam with a first lobe directed towards a flight path of a satellite and the second lobe directed towards the direction of an interfering device. The UT may cycle various coefficient parameters (e.g., linear system coefficients or values of a first antenna gain pattern having the first main lobe directed to the satellite path and values of a second antenna gain pattern having the second main lobe directed to the interfering device). The coefficients may be determined by identifying the best combination of the first antenna gain pattern and the second antenna gain pattern to minimize the effect of the interference (e.g., interference RSSI). A mapping of coefficients may be determined for all expected communication directions (e.g., a flight path of a satellite).

Some advantages of the present disclosure include providing a system, method, and/or device with lower computational complexity than conventional interference correction technologies that often require using a dense covariance matrix of the channel communication or computationally demanding data preprocesses procedures that are dependent on knowledge of the channel interference. In some aspects, the present disclosure may provide an extension of the present technology to account for interference correction of multiple interfering devices disposed at a diverse location within a communication region by adding multiple antenna gain patterns in combination to account for additional interfering entities. In some aspects, the present disclosure is agnostic to the interfering signal's power and can correct for an interfering signal even in the presence of a signal dynamically changing in power.

In an exemplary embodiment, a communication device may include an array antenna and beamforming circuitry coupled to the array antenna. The communication device may further include a processing device coupled to the beamforming circuitry. The processing device may receive a first RF signal via the beamforming circuitry at a first time. The beamforming circuitry may be configured with a first antenna gain pattern with a first main lobe oriented along a first direction (e.g., pointing in the first direction). The processing device further determines a radio frequency (RF) interference condition based on the first RF signal. The RF interference condition may be associated with an interfering device disposed along a second direction. The processing device further determines a second antenna gain pattern of the beamforming circuitry. The second antenna gain pattern comprises a second main lobe oriented along the second direction. The processing device generates first data indicating a set of directions comprising the first direction and a set of values each associated with a direction of the set of directions and the second antenna gain pattern. The processing device receives, at a second time after the first time, an indication of the first direction towards a specified position of an artificial satellite. The processing device determines, using the first data, a third antenna gain pattern. The third values of the third antenna gain pattern comprise a combination of first values of the first antenna gain pattern and a multiple (e.g., multiples) of second values of the second antenna gain pattern. The multiple corresponds to a value of the set of values associated with the first direction. The third antenna gain pattern may maximize signal reception along the first direction and minimize signal reception along the second direction (e.g., comprise a spatial signal minimum along the second direction). The processing device receives a second RF signal via the beamforming circuitry at a third time, after the second time with the beamforming circuitry configured with the third antenna gain pattern.

In another exemplary embodiment, a method includes receiving, by a first communication device having beamforming circuitry, an indication of a first direction. A second communication device may be located along the first direction. The method further includes determining, by the first communication device, that orienting a first main lobe of a first antenna gain pattern of the beamforming circuitry along the first direction results in an RF interference condition associated with a third communication device disposed along the second direction. The method further includes determining, by the first communication device, a second antenna gain pattern of the beamforming circuitry. The second antenna gain pattern comprises a second main lobe oriented along the second direction. The method further includes determining, by the first communication device, a third antenna gain pattern of the beamforming circuitry using a first combination of (i) corresponding values of the first antenna gain pattern and (ii) corresponding values of the second antenna gain pattern. The first combination corresponds to the first direction. The third antenna pattern may maximize signal reception along the first direction and minimize signal reception along the second directions (e.g., comprise a spatial signal minimum oriented along the second direction). The method further includes receiving, by the first communication device using the beamforming circuitry, a first RF signal with the beamforming circuitry configuration corresponding to the third antenna gain pattern.

FIG. 1 is a block diagram of a communication system 100 including a communication device with interference correction module 134, according to embodiments of the present disclosure. Communication system 100 includes communication devices 110, 120, and 130. Communication device 110 may transmit signals (e.g., using fixed service satellite transmitter 112 or more generally an RF signal transmitter). Communication device 110 may be in an artificial satellite and may include one or more satellite communication elements (e.g., discussed further in FIGS. 8-12). The fixed service transmitter 112 may include signal transmission devices (e.g., digital beamforming (DBF) circuitry, analog beamforming (ABF) circuitry) to generate and transmit a signal 150 (e.g., satellite downlink, fixed service transmission) to communication device 130. The signal 150 may correspond to a satellite downlink and/or uplink.

As shown in FIG. 1, communication system 100 includes a communication device 120 (e.g., an interfering device). Communication device 120 may include a fixed service transmitter 122 that sends signals 152 that interfere with signals 150 from communication device 130. The fixed service transmitter 122 may include signal transmission devices (e.g., digital beamforming (DBF) circuitry, analog beamforming (ABF) circuitry to generate and transmit a signal 150 (e.g., fixed service transmission) to communication device 130. The signal 150 may correspond to a satellite downlink and/or uplink.

In some embodiments, communication devices 110, 120, and 130 utilize the Wi-Fi® or IEEE 802.11 standard protocol. In other embodiments, the wireless connections may use some other wireless protocol, such as the current 3rd Generation Partnership Project (3GPP) long term evolution (LTE), or time division duplex (TDD)-Advanced systems. Communication devices 110, 120, and 130 may each include one or more antennas, receivers, transmitters, or transceivers that are configured to utilize a wireless local area network (WLAN) protocol, such as the Wi-Fi® or IEEE 802.11 standard protocol, other radio protocols, such as 3GPP LTE, or TDD-Advanced, or any combination of these or other communications standards. In one embodiment, the wireless communications between communication devices 110, 120, and 130 may utilize the same Wi-Fi® or IEEE 802.11 standard protocol or other protocols such as Bluetooth®, ZigBee, near field communications (NFC), or other protocols capable of communicating digitally encoded signal (e.g., cyclostationary digitally encoded RF signals).

Communication devices 110, 120, and 130 may comprise one or more directional or omnidirectional antennas (e.g., antenna 148, antenna 156, antenna 142), including, for example, dipole antennas, monopole antennas, patch antennas, loop antennas, microstrip antennas, or other types of antennas suitable for transmission of radio frequency (RF) signals. In some embodiments, instead of two or more antennas, a single antenna with multiple apertures may be used. In these embodiments, each aperture may be considered a separate antenna. In some embodiments, communication devices 110, 120, and 130 may utilize multiple-input multiple-output (MIMO) circuits and/or methodology. For example, antennas may be effectively separated to utilize spatial diversity and the different channel characteristics that may result between each of the antennas and the antennas of a transmitting station. In some MIMO embodiments, antennas may be separated by up to ¹⁄₁₀ of a wavelength or more.

In some embodiments, communication device 110 generates digitally encoded RF signals using one or more digital modulation schemes. In embodiments, communication device 110 leverages orthogonal frequency-division multiplexing (OFDM) to generate signal 150. OFDM is a digital multi-carrier modulation scheme that extends the concept of single subcarrier modulation by using multiple subcarriers within the same single channel. Rather than transmit a high-rate stream of data with a single subcarrier, OFDM makes use of a large number of closely-spaced orthogonal subcarriers that are transmitted in parallel. Each subcarrier is modulated with a conventional digital modulation scheme (such as quadrature phase shift keying (QPSK), 16QAM, etc.) at a symbol rate, $T_s$. However, the combination of many subcarriers enables data rates similar to conventional single-carrier modulation schemes within equivalent bandwidths.

In some embodiments, communication device 110 leverages quadrature amplitude modulation (QAM) to generate signals 150. QAM includes a signal in which two carriers are shifted in phase by 90 degrees (e.g., sine and cosine) and are modulated and combined. As a result of the phase difference, the phase-shifted carriers are in quadrature one with the other. Each of the signals includes a symbol rate, $T_s$, associated with a rate (e.g., frequency), the digital symbols occur within the QAM signal.

As shown in FIG. 1, communication device 130 receives signals 150 and signal 152 from communication device 110 and communication device 120. Communication device 130 includes processing device 132, memory device 138, and RF chain 136. The RF Chain 136 (e.g., antennas, ABF, low-noise amplifier (LNA), automatic gain controller (AGC), analog-to-digital converter (ADC), digital beamforming (DBF) device, etc. as will be discussed further in later embodiments) processes the received signals (e.g., directs analog and digital beamforming components, converts the signal to a digital representation, and processing the digital information) to produce digital samples of the received signal. As shown in FIG. 1, communication device 130 includes one or more processing devices 132, such as one or more CPUs, microcontrollers, field programmable gate arrays, or other types of processors. Processing device 132 processing the digital samples. Processing device 132 implements the interference correction module 134.

Communication device 130 includes one or more processor(s) 132, such as one or more CPUs, microcontrollers, field programmable gate arrays, or other types of processors. Communication device 130 also includes system memory 138, which may correspond to any combination of volatile and/or non-volatile storage mechanisms. The system memory 138 stores information that provides operating system components, various program modules, program data, and/or other components. In one embodiment, the system memory 138 stores instructions of methods to control the operation of the communication device 130. The electronic device 130 performs functions by using the processor(s) 132 to execute instructions provided by the system memory 138. For example, memory device(s) 138 may store interference data 140. Interference data 140 may indicate a mapping of target communication device directions and coefficient values for a combined antenna gain pattern that maximizes signal reception in the direction of the target communication device and minimizes signal reception in the direction of the interfering device (e.g., forms a main lobe in the direction of the target communication device and a spatial signal minimum in the direction of the interfering device). For example, each direction may be mapped to coefficients values of a combination of a first antenna gain pattern with a main lobe directed towards the target communication device (e.g., a satellite) and a second antenna gain pattern with a main lobe directed towards the interfering device.

Interference detection module 136 configures the RF chain (e.g., ABF and/or DBF devices) to receive signals in various directions. For example, the RF chain 136 may be configured to direct receive beams to receive signals at various beamforming angles. Receive beams may be directed using a weighting pattern across beamforming elements and an antenna array. The weighting pattern may result in a sensitivity pattern due to signal interference. An antenna gain pattern may include a weighting pattern (or distribution of signal processing weights) that may include a combination of beamforming values such as phase shifting values, signal amplifier values, etc. that are configured to steer a signal (e.g., main lobe, side lobes, signal minimum points, etc.) to orient at different directions. An antenna gain pattern may include a main lobe, side lobes, and signal minimums spread across various directions relative to a bearing angle of an antenna array. In some embodiment, a bearing angle is defined as a direction normal to a plane of an antenna array (or more generally a portion and an array antenna). Further details regarding beamforming and beam steering are discussed in FIG. 2.

The processing device 132 may direct the RF chain to receive signal 150 from communication device 110 by directing the receive beam along a direction towards a position of communication device 110. Interference correction module 134 may determine a direction towards the interfering device (communication device 120). For example, the interference correction module 134 may perform an interference survey to estimate the direction and strength of fixed service interference. Details of the survey are further discussed in association with FIG. 4. The interference correction module 134 performs an interference survey and determines an antenna gain pattern associated with that interference device with a main lobe directed towards the interfering device.

The interference correction module 134 may perform a sweep using a combination of beamforming parameters of a first antenna gain pattern with a main lobe directed towards a travel path of communication device 110 and beamforming parameters of a second antenna gain pattern with a main lobe directed towards the interfering device 120. The results of the interference correction survey may be stored in memory device(s) 138 (e.g., interference data 140). Interference correction module 134 may determine coefficients (e.g., multipliers) that correspond to different directions the communication device 110 may travel. The coefficients, as is discussed further in association with FIGS. 6A-C, indicate relative contributions (e.g., linear combinations) of beamforming parameters of the first antenna gain pattern (e.g., with main lobe directed towards the communication device 110) and the second antenna gain pattern (e.g., with main lobe directed towards the interfering device 120) and determines a third antenna gain pattern that combines beamforming contributions of the first antenna gain pattern and the second antenna gain pattern.

In some embodiments, the parameters of the combination of beamforming parameters of the first antenna gain pattern and the second antenna gain pattern may be determined using an optimization algorithm that identifies an optimal combination of coefficients to minimize the impacts of the interference device (e.g., finding a global or local minimum of an interference RSSI metric).

The determined third antenna gain pattern may maximize signal reception in the direction towards communication device 110 and minimize reception in the direction of communication device 120 (e.g., by including a main lobe directed towards communication device 110 and a spatial signal minimum in the direction of communication device 120). In some embodiments, more than one interfering device may be present. An additional antenna gain pattern may be determined for each additional interfering device, and a combination of coefficients of beamforming parameters may be determined for the additional antenna gain patterns to form in combination with the first antenna gain pattern and the second antenna gain pattern an aggregate antenna gain pattern that maximizing signal reception in the direction towards communication device 110 and minimizes reception in the direction of communication device 120 (e.g., with a main lobe directed towards the communication device 110 and a spatial signal minimum in the direction of each interfering device). Further details of the interference correction module 134 are discussed in FIGS. 2-7.

Although communication system 100 is illustrated as having several separate functional elements, one or more of the functional elements may be combined and may be implemented by combinations of software configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2:
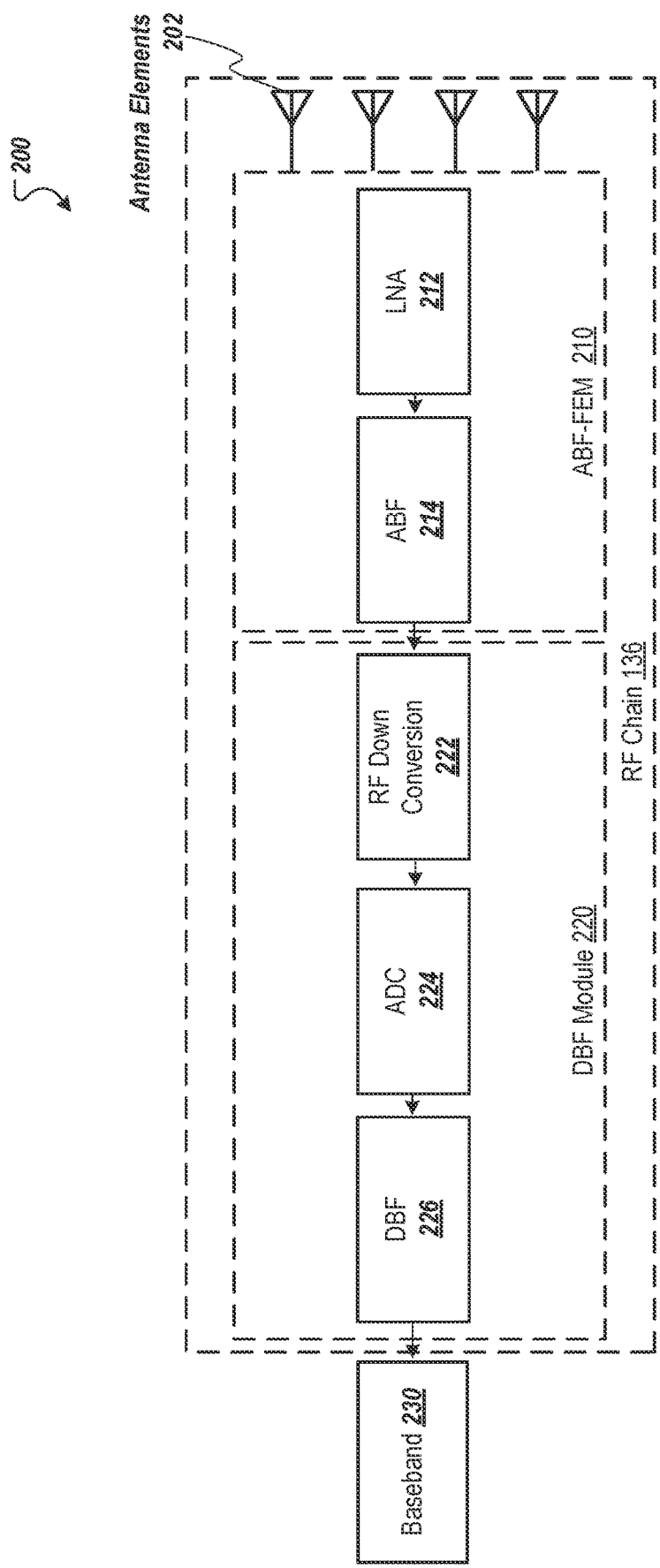
FIG. 2 is a functional diagram of a communication device with analog beamforming (ABF) circuitry and digital beamforming (DBF) circuitry, according to embodiments of the present disclosure.

FIG. 2 is a functional diagram of a communication device 200 with analog beamforming (ABF) circuitry and digital beamforming (DBF) circuitry, according to embodiments of the present disclosure. The communication device 200 includes an RF chain 136 that includes antenna elements 202, analog beamforming-front end module (ABF-FEM) 210, and digital beamforming (DBF) module 220. Antenna elements 202 are coupled to ABF-FEM 210, such as through RF ports. The ABF-FEM 210 includes a low noise amplifier (LNA) 212 and an ABF device 214. The LNA amplifies a low-power signal without significantly degrading the signal-to-noise (SNR) ratio. The ABF device 214 includes phase shifters that shift portions of received signal beams to align a phase of the received signal (e.g., signals received from the antenna elements 202) and combiners to combine the phase-aligned portions of the signal. The use of various power amplification values and phase shifter can effectively steer a receive beam of the antennas. For example, the antenna elements may be divided into multiple groups of distinct phases (e.g., four groups of antennas). It should be noted that FIG. 2 is a simplified illustration and that components of ABF device 214 (e.g., phase shifters) may not be directly coupled to the RF ports.

The ABF-FEM 210 is coupled to DBF module 220. DBF Module 220 includes an RF down conversion unit 222 coupled to ADC 224 and the DBF device 226. Phase shifters can be implemented in a digital domain of the DBF device 226. The phase shifters are coupled to a combiner. The combiner and phase shifters can be processing elements of the DBF device 226, such as a discrete component, a discrete circuit, logic circuitry, a digital functional block, a programmable block, a digital signal processing (DSP) functional block, or the like.

In some embodiments, a signal beam is received across an antenna array by antenna elements 202. The signal beam is transmitted through RF ports to ABF-FEM 210. To arrive at the antenna elements 102, the incoming signal beam may comprise variable path lengths to reach individual antenna elements 102 of the antenna array. The signal beam can be a primary beam made up of several subbeams that may or may not arrive from the safe direction. For example, subbeams of a signal beam propagating at 45 Degrees from nadir relative to the surface of the antenna array travel further to reach antenna elements 202 on a far side of the antenna array than to reach antenna elements on a near side of the antenna array relative to the incoming signal beam. The variable path length may result in the antenna elements 202 receiving the incoming signal beam in various phases across the antenna array. Each phase shifter receives subbeams of the signal from an associated antenna element 102. A phase shifter applies a phase shift to the subbeams of the incoming signal. For example, phase shifters may apply a relative phase shift to each subbeam such that each signal of the total incoming signal is realigned to be in phase. The relative phase shift may be associated with the variable path length of the signal across each of the antenna elements 202. The relative phase shift for an individual phase shifter 108 may be associated with the spatial location of an associated antenna element 202 of the antenna array. In some embodiments, the relative phase shift applied by the phase shifters may be associated with or coordinated with a time delay applied by ABF 214 and/or 226.

The RF chain using beamforming components such as ABF and DBF use various antenna gain patterns having various weighting values for signal process elements such as phase shifter, signal amplifier, processing filters, etc. The antenna gain pattern may result in a receive beam or a distribution of sensitivities resulting in a main lobe, side lobe, and signal minimums across the various direction from the array antenna. The various direction may be defined relative to a bearing angle of the array antenna. The bearing angle may be associated with a direction normal from a surface (or more generally a plane) of the array antenna. The various antenna gain patterns can effectively steer the main lobe, side lobes, and signal minimums to be directed at various angles by adjusting the various weighting of the signal process elements, as discussed above.

In some embodiments, a phase shifter 108 is associated with multiple antenna elements 202. For example, DBF device 226 and/or ABF device 214 may include one phase shifter coupled to receive signals from multiple antenna elements 102. As noted above, the phase shifter is not necessarily coupled to an antenna element 102. For example, there can be a down-conversion chain, including an analog-to-digital converter, before a signal gets to the phase shifter. Each phase shifter may shift the phase of signals received by multiple antenna elements 202. In another example, a DBF device 226 and/or ABF 214 may include a phase shifter for each antenna element 202 such that each phase shifter is associated only with an individual antenna element 202 of the antenna array.

In some embodiments, a combination of phase shifter values, amplifier values may be associated together into a weighted combination of values that effectively steer a beam (e.g., main lobes, side lobes, signal minimum points). For example, a main lobe may be pointed at a target communication device and/or an offset of the target communication device. In radio electronics, a signal minimum may include is a direction in an antenna's radiation pattern where the antenna radiates or combines signals to almost no radio waves. For example, the far-field signal strength is a local minimum. Signal minimums occur because different parts of an array antenna radiate radio waves of different phases resulting in constructive and destructive interference leading to lobes and spatial signal minimums.

The received signal may be phase-compensated both by the ABF device 214 and the DBF device 226 to generate the baseband signal 230. The DBF module 220 and the ABF-FEM 210 may direct beams independent of each other (e.g., a digital beamforming direction and an analog beamforming direction). As described herein, signal interference may result in the DBF module experiencing a saturation condition (e.g., ADC 224 clipping) when a signal is received in a given direction. Steering the analog receive beam (e.g., by ABF 214) to a different angle may result in the saturation condition being remedied (e.g., the saturation condition is no longer present). In some embodiments, the beam direction is controlled across two dimensions. For example, the analog beam may be directed along an elevation angle (e.g., relative to a horizon) and an azimuthal angle (e.g., parallel to the horizon).

In some embodiments, the DBF module includes multiple DBF chains (e.g., multiple ADCs). The saturation condition may occur when one of the ADC experiences saturation (e.g., clipping). In other embodiments, the saturation condition may correspond to a threshold number (e.g., threshold quantity) of ADCs experiencing saturation. Saturation generally refers to when the received signal power of the ADC operates outside an operational range of the ADC.

Figure 3:
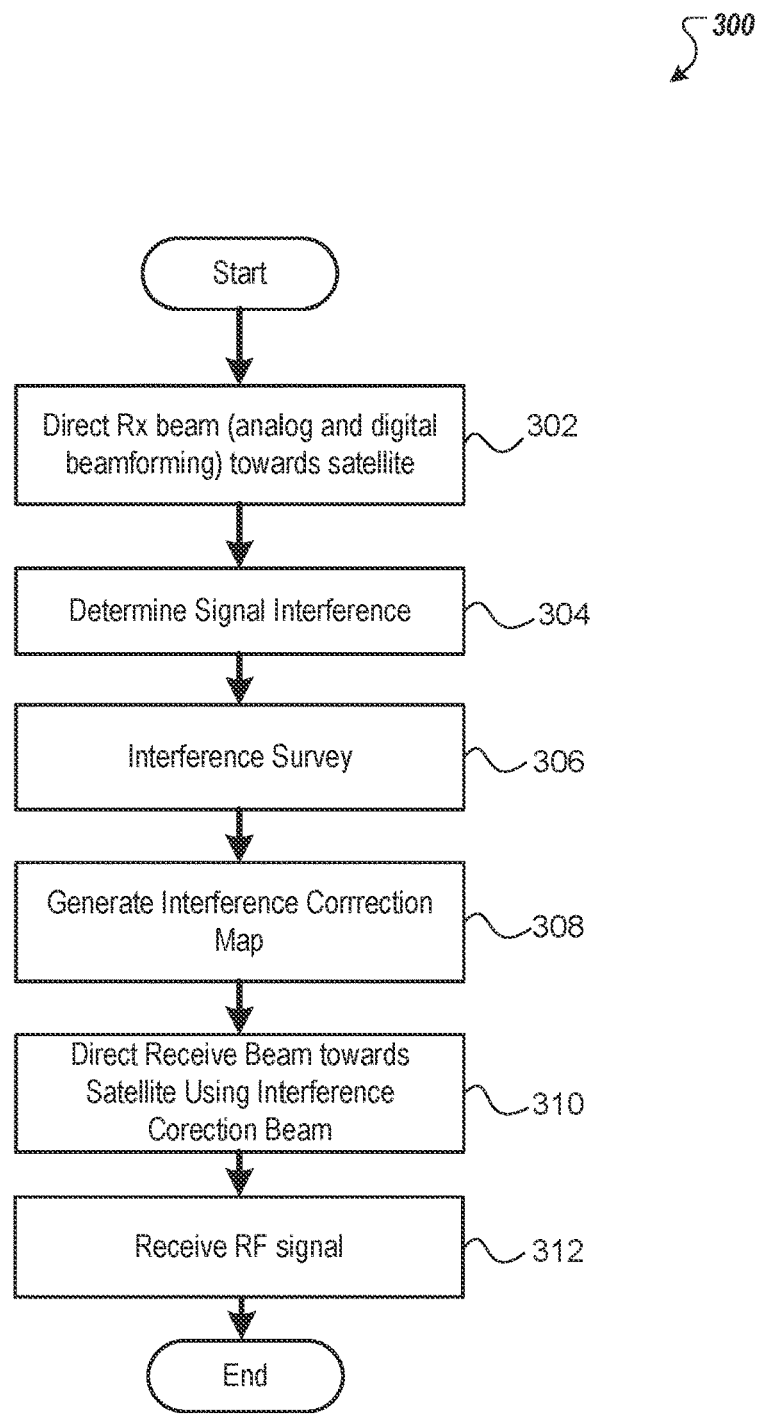
FIG. 3 depicts a spatial beamforming interference correction process corresponding to a communication device, according to embodiments of the present disclosure.

FIG. 3 depicts a spatial beamforming interference correction process 300 corresponding to a communication device, according to embodiments of the present disclosure. Process 300 may be performed by processing elements that may comprise hardware (circuitry, dedicated logic, etc.), software (such as run on a general purpose computer system or a dedicated machine), or any combination thereof. In one implementation, the process 300 is performed on communication device 130 using processing device 132 of FIG. 1. In another implementation, process 300 may be performed using communication device 130, respectively, while in some other implementations, one or more blocks of FIG. 3 may be performed by one or more other machines not depicted in the figures.

At block 302, processing logic directs a receive beam (e.g., analog and/or digital beams) towards a satellite (e.g., communication device 110 of FIG. 1). When receiving the RF signal, aiming beams (e.g., analog and digital) towards the communication source can provide relatively positive SNR results.

At block 304, processing logic determines an RF interference condition. As previously indicated, a communication device (e.g., a fixed service terrestrial device) may interfere with the reception of a downlink satellite communication by another communication device (e.g., a customer terminal (CT)). The saturation event may correspond to interference metrics (e.g., interference RSSI data, SNR data, signal-to-interference ratio (SIR) data, signal-interference-noise-ratio (SINR) data) that meet threshold conditions.

At block 306, processing logic scans an environment for interference. Scanning the environment includes steering a main lobe of an antenna gain pattern through various directions (e.g., a conical communication region surrounding an anticipated travel path of a target satellite) and determining signal strength for corresponding signals received while the main lobe is oriented in each of the corresponding directions (e.g., absent a communication signal from the target satellite). The beamforming circuitry may steer the main lobe (e.g., using digital and/or analog control) of the receive beam at various angles and determine signal strength data for each angle. The signal strength data may be compared against threshold conditions to determine directions corresponding to sources of interfering signals. Further details of the scanning process are discussed in FIG. 4.

At block 308, processing logic generates an interference correction map. The interference correction map stores data indicative of relative contributions of beamforming parameters of a first antenna gain pattern used in combination with beamforming parameters of a second antenna gain pattern. For example, the interference correction map (or more generally interference correction data) may indicate coefficient or values (e.g., coefficients of a linear system) for combining beamforming parameter values (e.g., a multiplier that is applied to each of the beamforming parameters of the second antenna gain pattern) of the first antenna pattern with the second antenna pattern.

The inference correction map may include directions and a set of values, each mapped to a corresponding direction. The values may indicate multiplication factors such as, for example, complex scalar multiplication factors, to be multiplied by values (e.g., beamforming parameters). In some embodiments, the interference map indicates a multiplication factor. In some embodiments, the interference map stores updated antenna gain patterns that incorporate coefficients stored in the interference map. For example, the interference data may indicate a third antenna beam pattern with beamforming parameters that are a combination (e.g., a linear combination of beamforming parameters of the first antenna gain pattern and beamforming parameters of the second antenna gain pattern). Further details regarding the interference correction map are discussed in conjunction with FIG. 5.

At block 310, processing logic directs the receive beam towards the satellite using an interference correction beam (e.g., the third antenna gain pattern) that maximizes signal reception towards the target satellite and minimizes signal reception towards the interfering device (e.g., and antenna gain pattern with a main lobe oriented towards a target satellite and a spatial signal minimum oriented along a direction towards an interfering device). The direction may be associated with an elevation angle and an azimuth angle. In some embodiments, the direction may be stored as a vector in any coordinates system such as, for example, Cartesian, cylindrical, spherical, and/or the like.

At block 312, processing logic receives an RF signal while the receive beam is configured in the third antenna gain pattern as described in associated with block 310.

Figure 4:
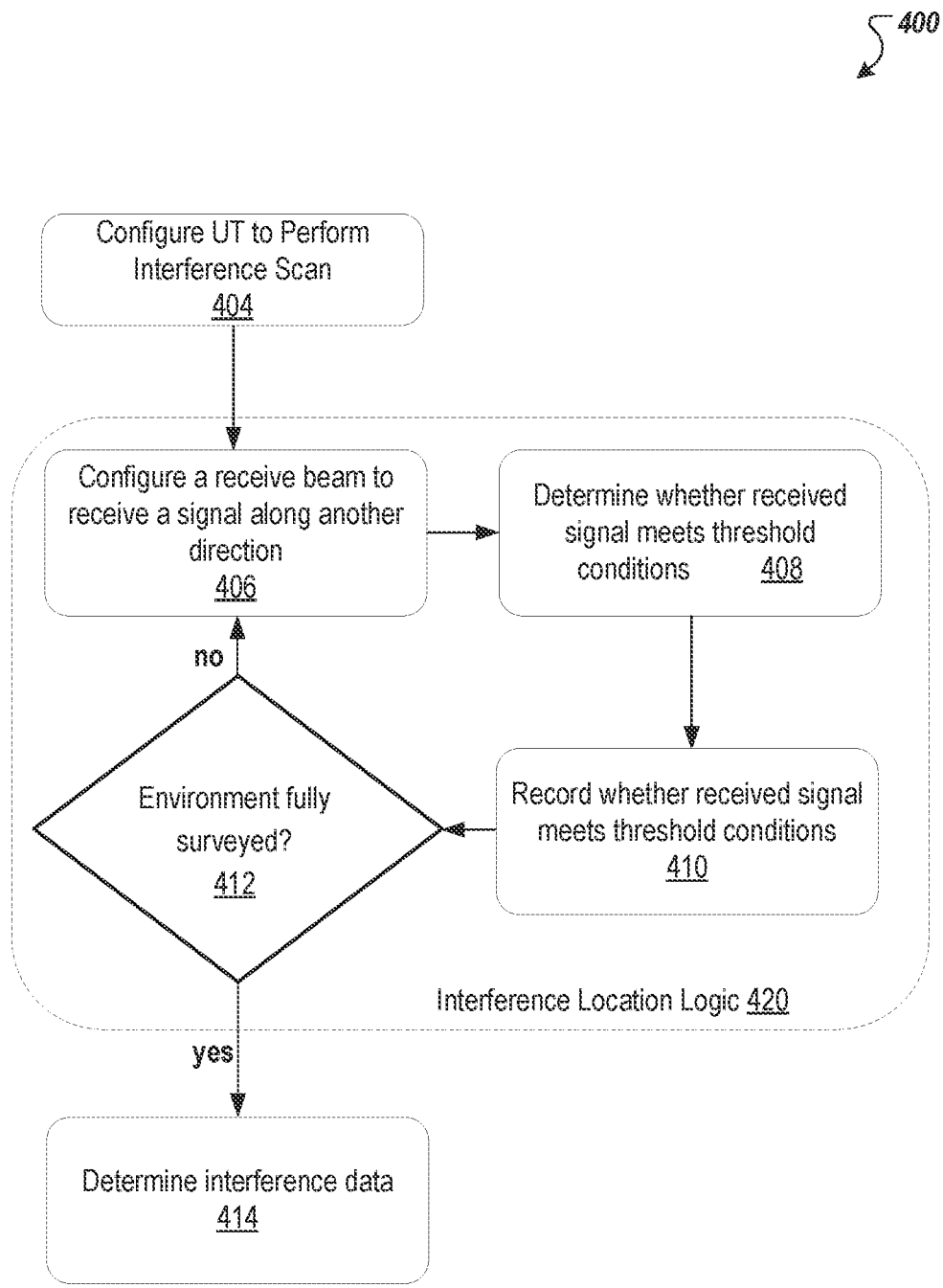
FIG. 4 depicts an interference locationing process, according to embodiments of the present disclosure.

FIG. 4 depicts an interference locationing process 400, according to embodiments of the present disclosure. Process 400 may be performed by processing elements that may comprise hardware (circuitry, dedicated logic, etc.), software (such as run on a general purpose computer system or a dedicated machine), or any combination thereof. In one implementation, the process 400 is performed on communication device 130 using processing device 132 of FIG. 1. In another implementation, process 400 may be performed using communication device 130, while in some other implementations, one or more blocks of FIG. 4 may be performed by one or more other machines not depicted in the figures.

At block 404, processing logic configures a device (e.g., a UT) to perform an interference locationing scan. As shown in FIG. 4, the initiation of the interference scan using interference locationing logic 420 may be responsive to determining whether an interference condition meets a threshold condition. In some embodiments, the interference locating logic is performed on a scheduled cadence (e.g., every few minutes, hours, once a day, etc.). The interference locationing logic 420 includes processing logic configuring a beam (e.g., phase shifter and/or signal amplifiers of ABF devices and/or DBF devices) to be directed along a direction (e.g., a first direction, a second direction, a third direction, and so on). At block 408, processing logic determines whether a threshold signal strength condition (e.g., threshold RSSI metric, SNR metric, SIR metric, SINR metric, and/or the like) is met when the receive beam is directed along the current direction. At block 410, processing logic records the signal strength metric along with the corresponding direction.

At block 412, processing logic determines whether the environment is fully surveyed/scanned. The processing logic may determine that the environment is not fully surveyed, and processing logic may continue along the no path to block 406, where another direction is selected and used. The processing logic may determine the environment is fully surveyed and continue along path "yes" to block 414. Processing logic may use a variety of conditions to determine whether the environment is fully surveyed. In some embodiments, the environment may be a pre-determined collection of directions such as, for example, a collection of angles (e.g., elevation angle, longitudinal, angle tangent to the horizon), a collection of vectors (e.g., Cartesian vectors, spherical vectors, cylindrical vectors, etc.). Processing logic may determine that an entirety of an environment may be scanned when data corresponding to each of the pre-determined collection of angles is measured and/or recorded.

At block 414, processing logic determines data indicating the location and relative signal strength of signals received in corresponding directions. In some embodiments, the interference map indicates an interference status associated with a direction of a beam. For example, the interference map may indicate whether direction a beam in a particular direction results in the receiving communication device experiencing a signal interference conditions. In some embodiments, processing logic determines the direction with that greatest signal strength condition. Process 400 may be performed many times to identify different locations with the greatest signal strength, and performing process 500 to identify beamforming parameters for each of the identified locations/directions.

Figure 5:
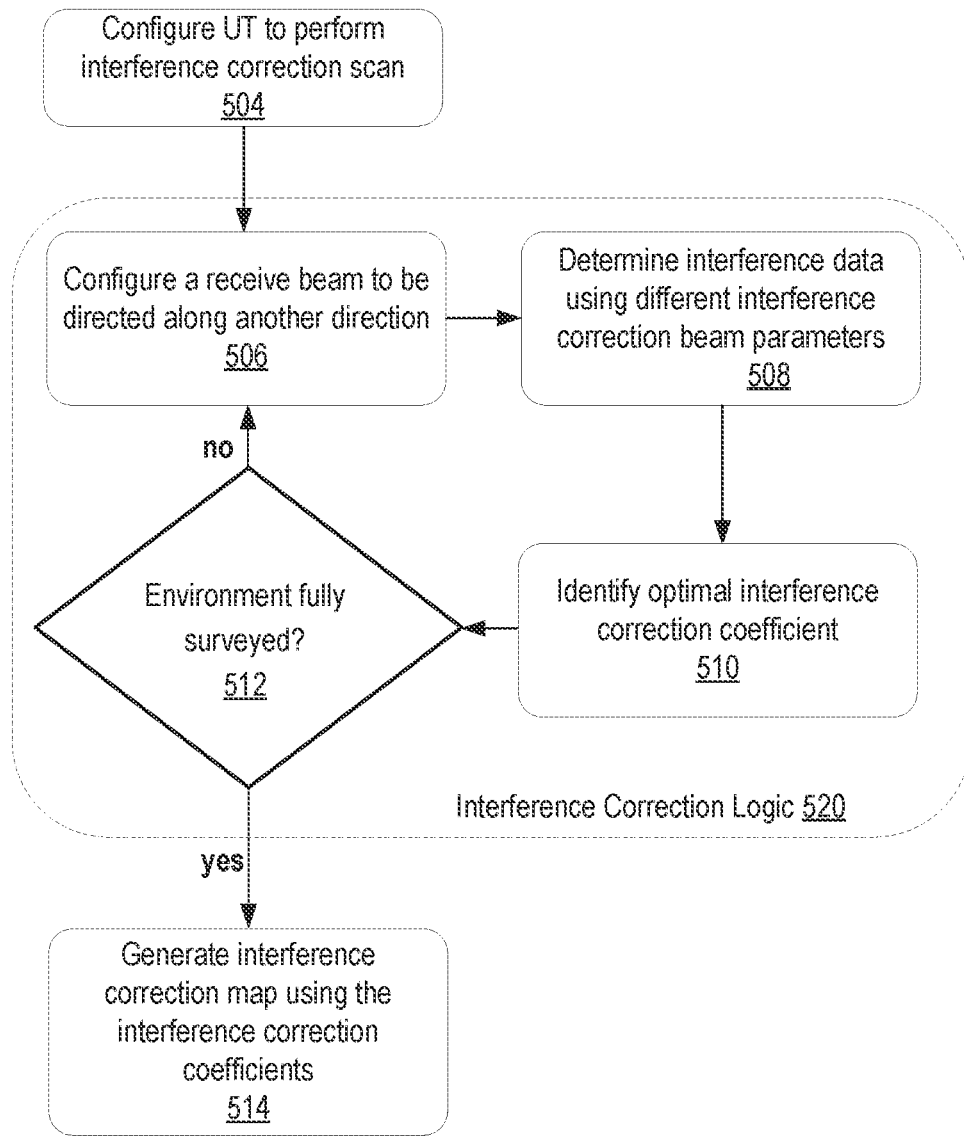
FIG. 5 depicts an interference correction map generation process, according to embodiments of the present disclosure.

FIG. 5 depicts an interference correction map generation process 500, according to embodiments of the present disclosure. Process 500 may be performed by processing elements that may comprise hardware (circuitry, dedicated logic, etc.), software (such as run on a general purpose computer system or a dedicated machine), or any combination thereof. In one implementation, the process 500 is performed on communication device 130 using processing device 132 of FIG. 1. In another implementation, process 500 may be performed using communication device 130, while in some other implementations, one or more blocks of FIG. 5 may be performed by one or more other machines not depicted in the figures.

At block 504, processing logic configures a device (e.g., a UT) to perform an interference correction scan. As shown in FIG. 5, the initiation of the interference scan using interference correction logic 520 may be responsive to determining whether an interference condition meets a threshold condition. In some embodiments, the interference locationing logic is performed on a scheduled cadence (e.g., every few minutes, hours, once a day, etc.). The interference locationing logic 520 includes processing logic configuring a beam (e.g., phase shifter and/or signal amplifiers of ABF devices and/or DBF devices) to be directed along interference direction(s) (e.g., directions where interfering devices have been detected such as through process 400) and determining an optimal (e.g., minimized inference conditions of the received signal) contribution (e.g., a coefficient) of beamforming parameters a second antenna gain pattern with a main lobe oriented in the interfering direction (e.g., maximize signal reception in the target direction and minimize signal reception along the interference direction). For example, the resulting antenna beamforming pattern may form a spatial reception minimum in a resulting or aggregate antenna gain pattern with a first antenna gain pattern with a main lobe oriented towards a target satellite.

At block 506, processing logic directs a main lobe of a first antenna pattern along a direction of a communication region (e.g., associated with a travel path of a target satellite). At block 508, processing logic varies a multiplier of beamforming parameters of a second antenna gain pattern (with a main lobe directed towards a source of interference) used in combination with the first antenna gain to maximize signal reception in the direction towards a target satellite and minimize signal reception along the direction of the source of interference. Processing logic alters a relative contribution of the second antenna pattern by altering a coefficient (e.g., multiplier) of beamforming parameters of the second antenna gain pattern and combines the parameters with beamforming parameters of the first antenna gain pattern to generate a third antenna gain pattern.

At block 510, processing logic determines the optimal (e.g., meeting threshold RSSI metrics, SNR metrics, SIR metrics, SNIR metrics, and/or the like) coefficient to use with a main lobe of the first antenna gain patent oriented in a corresponding direction. Processing logic records values (e.g., complex scalar multiplier of beamforming parameters of the second antenna gain pattern) and maps the values to the corresponding direction of the main lobe of the first antenna gain pattern when corresponding RF signals were received and processed.

At block 512, processing logic determines whether the environment is fully surveyed. The processing logic may determine that the environment is not fully surveyed, and processing logic may continue along the no path to block 506, where another direction is selected and used to determine another interference correction coefficient (e.g., the contribution of the second antenna gain pattern for a given direction of the main lobe of the first antenna gain pattern). The processing logic may determine whether the environment is fully surveyed and continue along the path "yes" to block 514. Processing logic may use a variety of conditions to determine whether the environment is fully surveyed. In some embodiments, the environment may be a pre-determined collection of directions such as, for example, a collection of angles (e.g., elevation angle, longitudinal, angle tangent to the horizon), a collection of vectors (e.g., Cartesian vectors, spherical vectors, cylindrical vectors, etc.). Processing logic may determine that an entirety of an environment may be scanned when data corresponding to each of the pre-determined collection of angles is measured and/or recorded.

In some embodiments, processing logic determines that the environment is fully surveyed when an interference correction coefficient is identified for every direction associated with a travel path of a target satellite.

At block 514, processing logic generates an interference correction map using the recorded data. The interference may include one or more features of interference maps or interference data discussed in other embodiments. In some embodiments, the interference map indicates a contribution metric and/or magnitude (e.g., coefficient, complex scalar multiplier) of a interference correction antenna gain pattern to be used in conjunction with a receive beam antenna gain pattern directed towards a satellite along a particular direction.

In some embodiments, the interference correction data may be stored in a data structure having key-value pairs. The key of each key-value pair may correspond to a direction in radian coordinates (azimuth, elevation), and a value of each key pair corresponds to a coefficient or multiplier (e.g., a complex scalar multiplier of a linear system coefficient) associated with the second antenna gain pattern. In some embodiments, processing logic determines a corrective direction for every angle experiencing the saturation condition. The interference map may indicate the corrective direction and, alternatively or in addition to, a status of the saturation condition for each direction. For example, processing logic may access the interference map to check whether a corresponding angle corresponds to the saturation condition. In another example, processing logic may access the interference map to determine an updated direction to orient beamforming devices to receive a signal without experiencing the saturation condition.

Figure 6C:
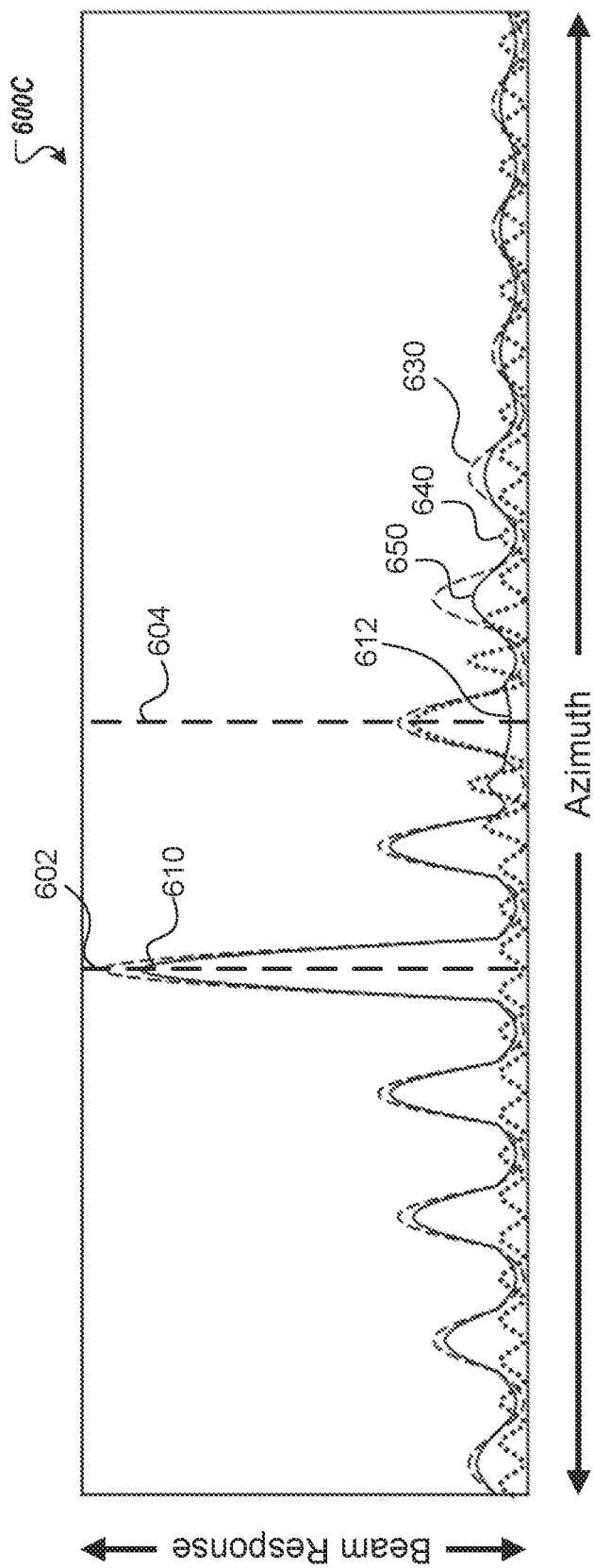

FIGS. 6A-C depict graphs 600A-C illustrating antenna gain patterns associated with spatial beamforming interference correction, according to embodiments of the present disclosure. FIG. 6A illustrates what is referred to throughout as the first antenna gain pattern 630 with first beamforming values or coefficients $c_1$. The first antenna gain pattern 630 includes a main lobe 606 oriented along a direction 602 of a target satellite and may include side lobes, spatial signal minimums, or other beamforming features oriented along a direction 604 towards an interference device. FIG. 6B illustrates what is referred to throughout as the first antenna gain pattern 630 with second beamforming values or coefficients $c_2$. The second antenna gain pattern includes a main lobe 608 oriented along a direction 604 towards the interference device and side lobes, spatial signal minimums, or other beamforming features oriented along a direction 604 towards a target satellite.

FIG. 6C illustrates the first antenna beam pattern 630, the second antenna beam pattern 640, and the third antenna beam pattern 650 with third beamforming values or coefficients, $c_3$. The third antenna beam pattern 650 comprises a combination of beamforming parameters of the first antenna gain pattern and the second antenna gain pattern. For example, beamforming values or coefficients of the third antenna gain pattern may be expressed as a linear combination as $c_3=c_1+wc_2$, wherein w is a multiplication factor of parameters of the second antenna gain pattern (e.g., determined using process 500 or FIG. 5).

As seen in FIG. 6, the third antenna gain pattern includes a main lobe 610 (e.g., signal reception maximum) oriented along direction 602 towards a target satellite and a spatial signal minimum 612 (e.g., signal reception minimum) oriented along direction 604 towards an interfering device.

Figure 7:
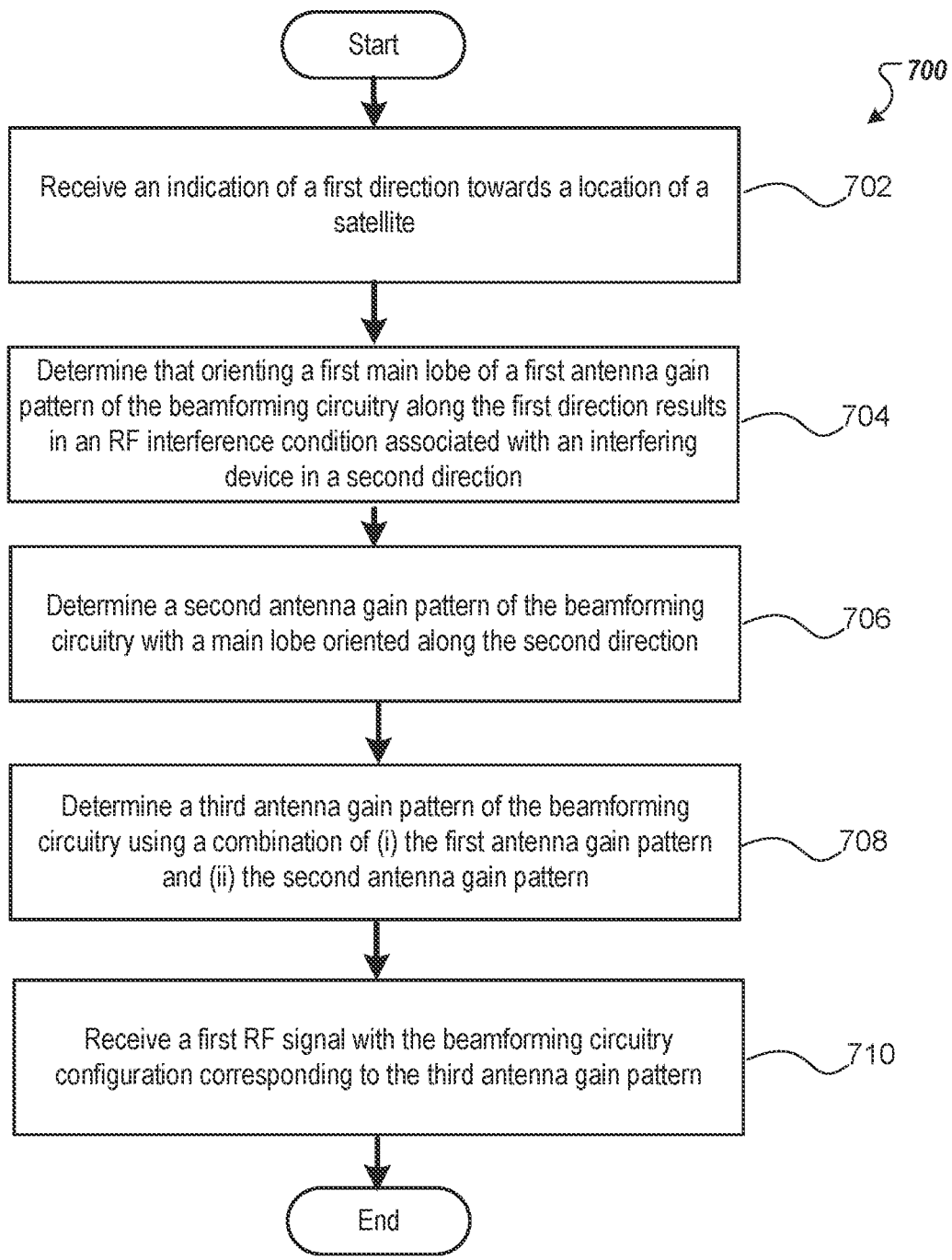
FIG. 7 is a flow diagram of a method for spatial beamforming interference correction, according to embodiments of the present disclosure.

FIG. 7 is a flow diagram of a method 700 for spatial beamforming interference correction, according to embodiments of the present disclosure. Method 700 may be performed by processing elements that may comprise hardware (circuitry, dedicated logic, etc.), software (such as executing on a general purpose computer system or a dedicated machine), or any combination thereof. In one implementation, method 700 is performed on communication device 130 using processing device 132 of FIG. 1. In another implementation, process 300 may be performed using communication device 130, respectively, while in some other implementations, one or more blocks of FIG. 7 may be performed by one or more other machines not depicted in the figures.

At block 702, processing logic receives an indication of a first direction towards a location of a satellite.

At block 704, processing logic determines that orienting a first main lobe of a first antenna gain pattern of the beamforming circuitry along the first direction results in an RF interference condition associated with an interfering device in a second direction. As indicated in other embodiments, an interference condition may be indicated by determining one or more interference metrics (e.g., interference RSSI, SNR, SIR, SNIR, etc.) is above a threshold condition.

In some embodiments, processing logic causes beamforming circuitry to direct a main lobe of a first antenna gain pattern along each of a set of directions. Processing logic may determine signal strength data (e.g., RSSI, SNR, SIR, SNIR, etc.) associated with receipt of a corresponding RF signal for each direction of the set of directions. Processing logic may determine a direction of an interfering device based on the signal strength data.

At block 706, processing logic determines a second antenna gain pattern of the beamforming circuitry with a main lobe oriented along the second direction. In some embodiments, multiple antenna gain patterns may be determined each mapped or otherwise associated with an interfering device (e.g., having a main lobe oriented along a direction of the corresponding device).

At block 708, processing logic determines a third antenna gain pattern of the beamforming circuitry using a combination of (i) values of the first antenna gain pattern and (ii) values of the second antenna gain pattern that maximizes signal reception along the first direction and minimizes signal reception along the second direction (e.g., a spatial signal minimum along the second direction and main lobe oriented along the first direction). For example, beamforming parameters of the third antenna gain pattern $c_{3\{\theta,\phi\}}$, may include a combination of beamforming parameters of the first antenna gain pattern $c_{1\{\theta,\phi\}}$ and the second antenna gain pattern $c_{2\{\theta,\phi\}}$, such that $c_{3\{\theta,\phi\}}=c_{1\{\theta,\phi\}}+wc_{2\{\theta,\phi\}}$, wherein w is direction on the direction $\{\theta, \phi\}$ of the target satellite and represents a coefficient (e.g., complex scalar multiplier) of beamforming parameters of the second antenna used in combination with beamforming parameters of the first antenna gain patter.

At block 710, processing logic receives a first RF signal with the beamforming circuitry configuration corresponding to the third antenna gain pattern.

In some embodiments, processing logic determines that an RF interference condition may be further associated with a fourth communication device positioned along a third direction. Processing logic may further determine a fourth antenna gain pattern of the beamforming circuitry. The fourth antenna gain pattern may comprise a fourth main lobe oriented along the third direction. The third antenna gain pattern may be configured to include a series of beamforming components contributions of multiple beamforming patterns, each associated with (e.g., having a main lobe oriented along a direction towards a corresponding interfering device) a corresponding interfering device. The third antenna gain pattern may maximize signal reception towards of a target satellite and minimize signal reception along a direction associated with a corresponding interfering device (e.g., a antenna gain pattern with a main lobe oriented towards a direction of a target satellite and one or more signal reception minimum oriented along a direction associated with corresponding interfering devices).

In some embodiments, processing logic causes the beamforming circuitry to direct the main lobe along each of a set of directions. Processing logic may determine, for each direction in a set of directions, interference data corresponding to receipt of corresponding RF signals using antenna gain patterns with different combinations of (i) values of the first antenna gain pattern with the first main lobe oriented in a corresponding direction and (ii) a multiple of the values of the second antenna gain pattern. Processing logic may further generate a set of values where a corresponding value indicates a multiplier of the values of the second antenna gain pattern.

Figure 8:
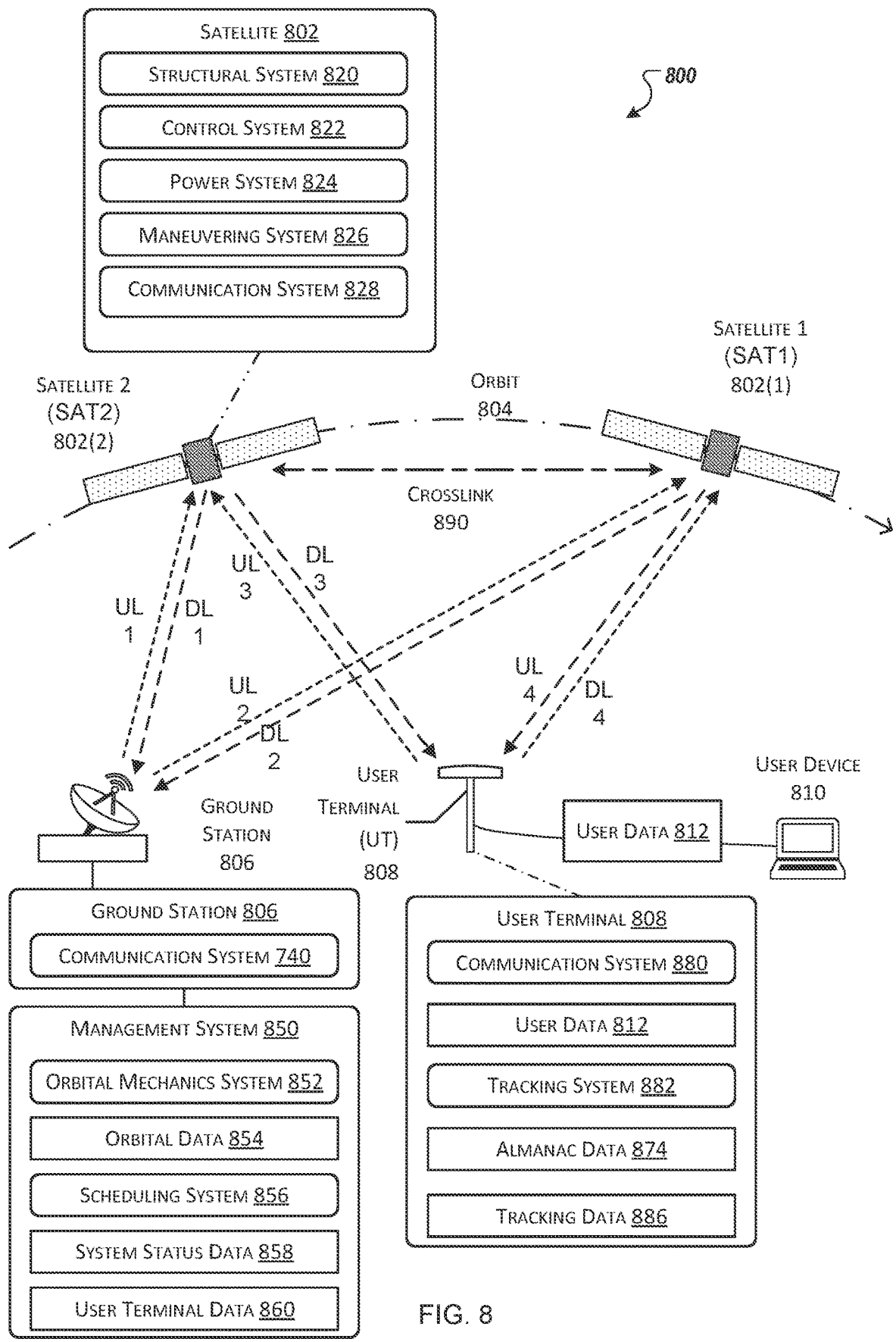
FIG. 8 illustrates a portion of a communication system that includes two satellites of a constellation of satellites, each satellite being in orbit, according to embodiments of the present disclosure.

FIG. 8 illustrates a portion of a communication system 800 that includes two satellites of a constellation of satellites 802(1), 802(2), . . . , 802(S), each satellite 802 being in orbit 804 according to embodiments of the present disclosure. The system 800 shown here comprises a plurality (or "constellation") of satellites 802(1), 802(2), . . . , 802(S), each satellite 802 being in orbit 804. Any of the satellites 802 can include the communication system 100 of FIG. 1 or communication device 200 of FIG. 2 and other array antennas and receiving (Rx) and/or transmission (Tx) DBF devices described herein. Also shown is a ground station 806, a user terminal (UT) 808, and a user device 810.

The constellation may comprise hundreds or thousands of satellites 802, in various orbits 804. For example, one or more of these satellites 802 may be in non-geosynchronous orbits (NGOs) in which they are in constant motion with respect to the Earth. For example, the orbit 804 is a low earth orbit (LEO). In this illustration, orbit 804 is depicted with an arc pointed to the right. A first satellite (SAT1) 1302(1) is leading (ahead of) a second satellite (SAT2) 802(2) in the orbit 804.

The satellite 802 may comprise a structural system 820, a control system 822, a power system 824, a maneuvering system 826, and a communication system 828. In other implementations, some systems may be omitted or other systems added. One or more of these systems may be communicatively coupled with one another in various combinations.

The structural system 820 comprises one or more structural elements to support the operation of the satellite 802. For example, the structural system 820 may include trusses, struts, panels, and so forth. The components of other systems may be affixed to or housed by the structural system 820. For example, the structural system 820 may provide mechanical mounting and support for solar panels in the power system 824. The structural system 820 may also provide for thermal control to maintain components of the satellite 1302 within operational temperature ranges. For example, the structural system 820 may include louvers, heat sinks, radiators, and so forth.

The control system 822 provides various services, such as operating the onboard systems, resource management, providing telemetry, processing commands, and so forth. For example, the control system 822 may direct the operation of the communication system 828.

The power system 824 provides electrical power to operate the components onboard the satellite 802. The power system 824 may include components to generate electrical energy. For example, the power system 824 may comprise one or more photovoltaic cells, thermoelectric devices, fuel cells, and so forth. The power system 824 may include components to store electrical energy. For example, the power system 824 may comprise one or more batteries, fuel cells, and so forth.

The maneuvering system 826 maintains the satellite 802 in one or more of a specified orientation or orbit 804. For example, the maneuvering system 826 may stabilize the satellite 802 with respect to one or more axis. In another example, the maneuvering system 826 may move the satellite 802 to a specified orbit 804. The maneuvering system 826 may include one or more computing devices, sensors, thrusters, momentum wheels, solar sails, drag devices, and so forth. For example, the sensors of the maneuvering system 826 may include one or more global navigation satellite system (GNSS) receivers, such as global positioning system (GPS) receivers, to provide information about the position and orientation of the satellite 802 relative to Earth. In another example, the sensors of the maneuvering system 826 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 828 provides communication with one or more other devices, such as other satellites 802, ground stations 806, user terminals 808, and so forth. The communication system 828 may include one or more modems, digital signal processors, power amplifiers, antennas (including at least one antenna that implements multiple antenna elements, such as a phased array antenna, an embedded calibration antenna, such as the calibration antenna 804 as described herein), processors, memories, storage devices, communications peripherals, interface buses, and so forth. Such components support communications with other satellites 802, ground stations 806, user terminals 808, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 828 may be output to other systems, such as the control system 822, for further processing. Output from a system, such as the control system 822, may be provided to the communication system 828 for transmission.

One or more ground stations 806 are in communication with one or more satellites 802. The ground stations 806 may pass data between the satellites 802, a management system 850, networks such as the Internet, and so forth. The ground stations 806 may be emplaced on land, on vehicles, at sea, and so forth. Each ground station 806 may comprise a communication system 840. Each ground station 806 may use the communication system 840 to establish communication with one or more satellites 802, other ground stations 806, and so forth. The ground station 806 may also be connected to one or more communication networks. For example, the ground station 806 may connect to a terrestrial fiber optic communication network. The ground station 806 may act as a network gateway, passing user data 812 or other data between the one or more communication networks and the satellites 802. Such data may be processed by the ground station 806 and communicated via the communication system 840. The communication system 840 of a ground station may include components similar to those of the communication system 828 of a satellite 802 and may perform similar communication functionalities. For example, the communication system 840 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 806 are in communication with a management system 850. The management system 850 is also in communication, via the ground stations 806, with the satellites 802 and the UTs 808. The management system 850 coordinates the operation of the satellites 802, ground stations 806, UTs 808, and other resources of the system 800.

The management system 850 may comprise one or more of an orbital mechanics system 852 or a scheduling system 856. In some embodiments, the scheduling system 856 can operate in conjunction with an HD controller.

The orbital mechanics system 852 determines orbital data 854 that is indicative of a state of a particular satellite 802 at a specified time. In one implementation, the orbital mechanics system 852 may use orbital elements that represent characteristics of the orbit 804 of the satellites 802 in the constellation to determine the orbital data 854 that predicts location, velocity, and so forth of particular satellites 802 at particular times or time intervals. For example, the orbital mechanics system 852 may use data obtained from actual observations from tracking stations, data from the satellites 802, scheduled maneuvers, and so forth to determine the orbital elements. The orbital mechanics system 852 may also consider other data, such as space weather, collision mitigation, orbital elements of known debris, and so forth.

The scheduling system 856 schedules resources to provide communication to the UTs 808. For example, the scheduling system 856 may determine handover data that indicates when communication is to be transferred from the first satellite 802(1) to the second satellite 802(2). Continuing the example, the scheduling system 856 may also specify communication parameters such as frequency, timeslot, and so forth. During operation, the scheduling system 856 may use information such as the orbital data 854, system status data 858, user terminal data 860, and so forth.

The system status data 858 may comprise information such as which UTs 808 are currently transferring data, satellite availability, current satellites 802 in use by respective UTs 808, capacity available at particular ground stations 806, and so forth. For example, the satellite availability may comprise information indicative of satellites 802 that are available to provide communication service or those satellites 802 that are unavailable for communication service. Continuing the example, a satellite 802 may be unavailable due to malfunction, previous tasking, maneuvering, and so forth. The system status data 858 may be indicative of past status, predictions of future status, and so forth. For example, the system status data 858 may include information such as projected data traffic for a specified interval of time based on previous transfers of user data 812. In another example, the system status data 858 may be indicative of future statuses, such as a satellite 802 being unavailable to provide communication service due to scheduled maneuvering, scheduled maintenance, scheduled decommissioning, and so forth.

The user terminal data 860 may comprise information such as a location of a particular UT 808. The user terminal data 860 may also include other information such as a priority assigned to user data 812 associated with that UT 808, information about the communication capabilities of that particular UT 808, and so forth. For example, a particular UT 808 in use by a business may be assigned a higher priority relative to a UT 808 operated in a residential setting. Over time, different versions of UTs 808 may be deployed, having different communication capabilities such as being able to operate at particular frequencies, supporting different signal encoding schemes, having different antenna configurations, and so forth.

The UT 808 includes a communication system 880 to establish communication with one or more satellites 802. The communication system 880 of the UT 808 may include components similar to those of the communication system 828 of a satellite 802 and may perform similar communication functionalities. For example, the communication system 880 may include one or more modems, digital signal processors, power amplifiers, antennas (including at least one antenna that implements multiple antenna elements, such as a phased array antenna), processors, memories, storage devices, communications peripherals, interface buses, and so forth. The UT 808 passes user data 812 between the constellation of satellites 802 and the user device 810. The user data 812 includes data originated by the user device 810 or addressed to the user device 810. The UT 808 may be fixed or in motion. For example, the UT 808 may be used at a residence or on a vehicle such as a car, boat, aerostat, drone, airplane, and so forth.

The UT 808 includes a tracking system 882. The tracking system 882 uses almanac data 884 to determine tracking data 886. The almanac data 884 provides information indicative of orbital elements of the orbit 804 of one or more satellites 802. For example, the almanac data 884 may comprise orbital elements such as "two-line element" data for the satellites 802 in the constellation that are broadcast or otherwise sent to the UTs 808 using the communication system 880.

The tracking system 882 may use the current location of the UT 808 and the almanac data 884 to determine the tracking data 886 for the satellite 802. For example, based on the current location of the UT 808 and the predicted position and movement of the satellites 802, the tracking system 882 can calculate the tracking data 886. The tracking data 886 may include information indicative of azimuth, elevation, distance to the second satellite, time of flight correction, or other information at a specified time. The determination of the tracking data 886 may be ongoing. For example, the first UT 808 may determine tracking data 886 every 1000 ms, every second, every five seconds, or at other intervals.

With regard to FIG. 8, an uplink is a communication link that allows data to be sent to a satellite 802 from a ground station 806, UT 1308, or a device other than another satellite 802. Uplinks are designated as UL1, UL2, UL3, and so forth. For example, UL1 is a first uplink from the ground station 806 to the second satellite 1302(2). In comparison, a downlink is a communication link that allows data to be sent from the satellite 802 to a ground station 806, UT 808, or device other than another satellite 802. For example, DL1 is a first downlink from the second satellite 802(2) to the ground station 806. The satellites 802 may also be in communication with one another. For example, a crosslink 890 provides for communication between satellites 802 in the constellation.

The satellite 802, the ground station 806, the user terminal 808, the user device 810, the management system 850, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions by using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

Figure 9:
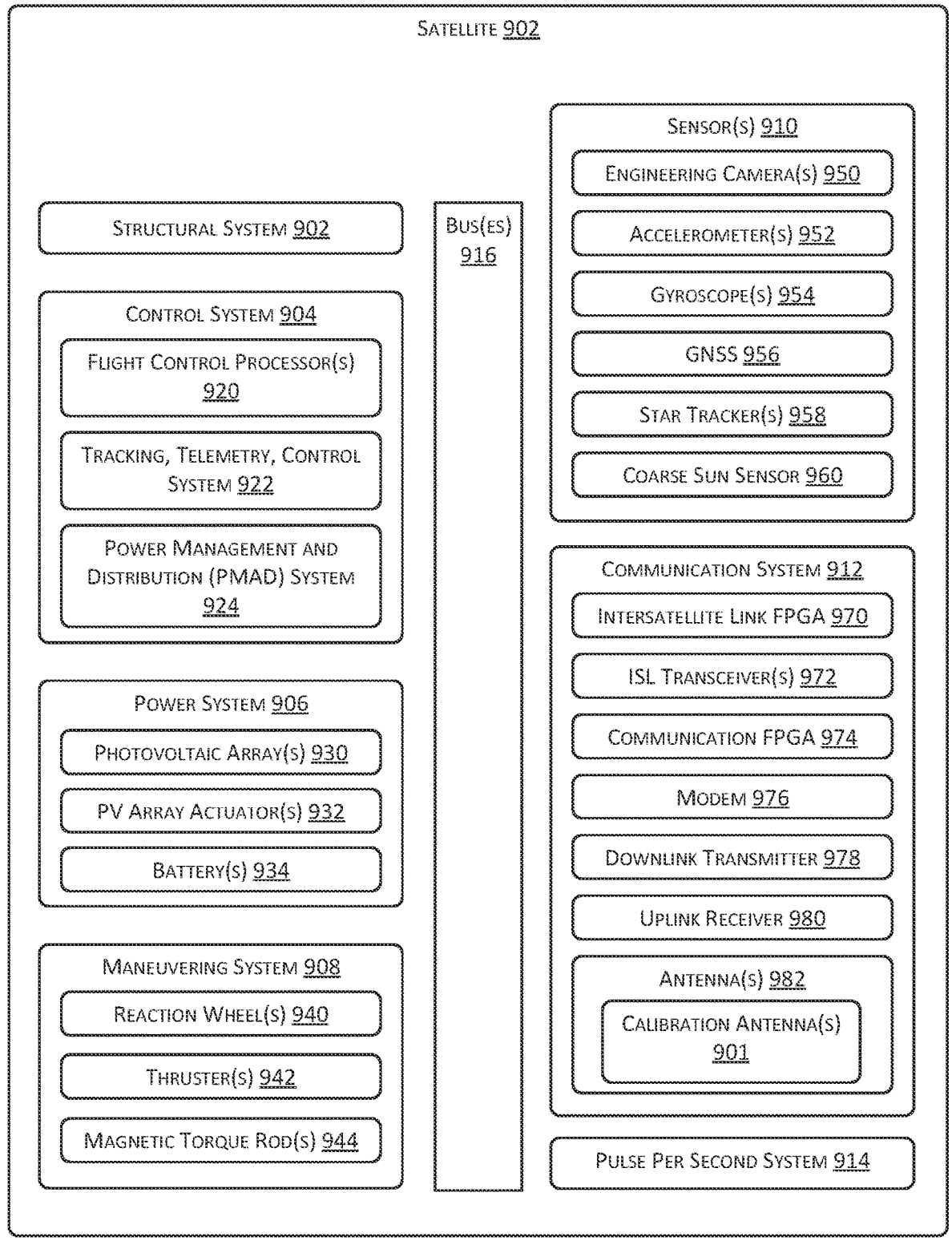
FIG. 9 is a functional block diagram of some systems associated with the satellite, according to some implementations.

FIG. 9 is a functional block diagram of some systems associated with the satellite 802, according to some implementations. The satellite 802 may comprise a structural system 902, a control system 904, a power system 906, a maneuvering system 908, one or more sensors 910, and a communication system 912. A pulse per second (PPS) system 914 may be used to provide a timing reference to the systems onboard the satellite 802. One or more busses 916 may be used to transfer data between the systems onboard the satellite 802. In some implementations, redundant busses 916 may be provided. The busses 916 may include, but are not limited to, data busses such as Controller Area Network Flexible Data Rate (CAN FD), Ethernet, Serial Peripheral Interface (SPI), and so forth. In some implementations, the busses 916 may carry other signals. For example, a radio frequency bus may comprise a coaxial cable, waveguides, and so forth to transfer radio signals from one part of the satellite 802 to another. In other implementations, some systems may be omitted, or other systems added. One or more of these systems may be communicatively coupled with one another in various combinations.

The structural system 902 comprises one or more structural elements to support the operation of the satellite 802. For example, the structural system 902 may include trusses, struts, panels, and so forth. The components of other systems may be affixed to or housed by the structural system 902. For example, the structural system 902 may provide mechanical mounting and support for solar panels in the power system 906. The structural system 902 may also provide for thermal control to maintain components of the satellite 802 within operational temperature ranges. For example, the structural system 902 may include louvers, heat sinks, radiators, and so forth.

The control system 904 provides various services, such as operating the onboard systems, resource management, providing telemetry, processing commands, and so forth. For example, the control system 904 may direct the operation of the communication system 912. The control system 904 may include one or more flight control processors 920. The flight control processors 920 may comprise one or more processors, FPGAs, and so forth. A tracking, telemetry, and control (TTC) system 922 may include one or more processors, radios, and so forth. For example, the TTC system 922 may comprise a dedicated radio transmitter and receiver to receive commands from a ground station 806, send telemetry to the ground station 806, and so forth. A power management and distribution (PMAD) system 924 may direct the operation of the power system 906, control distribution of power to the systems of the satellite 802, control battery 934 charging, and so forth.

The power system 906 provides electrical power to operate the components onboard the satellite 802. The power system 906 may include components to generate electrical energy. For example, the power system 906 may comprise one or more photovoltaic arrays 930 comprising a plurality of photovoltaic cells, thermoelectric devices, fuel cells, and so forth. One or more PV array actuators 932 may be used to change the orientation of the photovoltaic array(s) 930 relative to the satellite 1802. For example, the PV array actuator 932 may comprise a motor. The power system 906 may include components to store electrical energy. For example, the power system 906 may comprise one or more batteries 934, fuel cells, and so forth.

The maneuvering system 908 maintains the satellite 802 in one or more of a specified orientation or orbit 804. For example, the maneuvering system 908 may stabilize the satellite 802 with respect to one or more axes. In another example, the maneuvering system 908 may move the satellite 802 to a specified orbit 804. The maneuvering system 908 may include one or more of reaction wheel(s) 940, thrusters 942, magnetic torque rods 944, solar sails, drag devices, and so forth. The thrusters 942 may include, but are not limited to, cold gas thrusters, hypergolic thrusters, solid-fuel thrusters, ion thrusters, arcjet thrusters, electrothermal thrusters, and so forth. During operation, the thrusters may expend propellent. For example, an electrothermal thruster may use water as propellent, using electrical power obtained from the power system 906 to expel the water and produce thrust. During operation, the maneuvering system 908 may use data obtained from one or more of the sensors 910.

The satellite 802 includes one or more sensors 910. The sensors 910 may include one or more engineering cameras 950. For example, an engineering camera 950 may be mounted on the satellite 802 to provide images of at least a portion of the photovoltaic array 930. Accelerometers 952 provide information about the acceleration of the satellite 802 along one or more axes. Gyroscopes 954 provide information about the rotation of the satellite 802 with respect to one or more axes. The sensors 910 may include a global navigation satellite system (GNSS) 956 receiver, such as a Global Positioning System (GPS) receiver, to provide information about the position of the satellite 802 relative to Earth. In some implementations, the GNSS 956 may also provide information indicative of velocity, orientation, and so forth. One or more star trackers 958 may be used to determine an orientation of the satellite 802. A coarse sun sensor 960 may be used to detect the sun, provide information on the relative position of the sun with respect to the satellite 802, and so forth. The satellite 802 may include other sensors 910 as well. For example, the satellite 802 may include a horizon detector, radar, lidar, and so forth.

The communication system 912 provides communication with one or more other devices, such as other satellites 802, ground stations 806, user terminals 808, and so forth. The communication system 912 may include one or more modems 976, digital signal processors, power amplifiers, antennas 982 (including at least one antenna that implements multiple antenna elements, such as a phased array antenna such as the antenna elements 148 of FIG. 1), processors, memories, storage devices, communications peripherals, interface buses, and so forth. Such components support communications with other satellites 802, ground stations 806 user terminals 808, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 912 may be output to other systems, such as the control system 904, for further processing. Output from a system, such as the control system 904, may be provided to the communication system 912 for transmission.

The communication system 912 may include hardware to support the intersatellite link 890. For example, an intersatellite link FPGA 970 may be used to modulate data sent and received by an ISL transceiver 972 to send data between satellites 902. The ISL transceiver 972 may operate using radio frequencies, optical frequencies, and so forth.

A communication FPGA 974 may be used to facilitate communication between the satellite 802 and the ground stations 806, UTs 808, and so forth. For example, the communication FPGA 974 may direct the operation of a modem 976 to modulate signals sent using a downlink transmitter 978 and demodulate signals received using an uplink receiver 980. The satellite 802 may include one or more antennas 982. For example, one or more parabolic antennas may be used to provide communication between the satellite 802 and one or more ground stations 806. In another example, a phased array antenna may be used to provide communication between the satellite 802 and the UTs 808.

Figure 10:
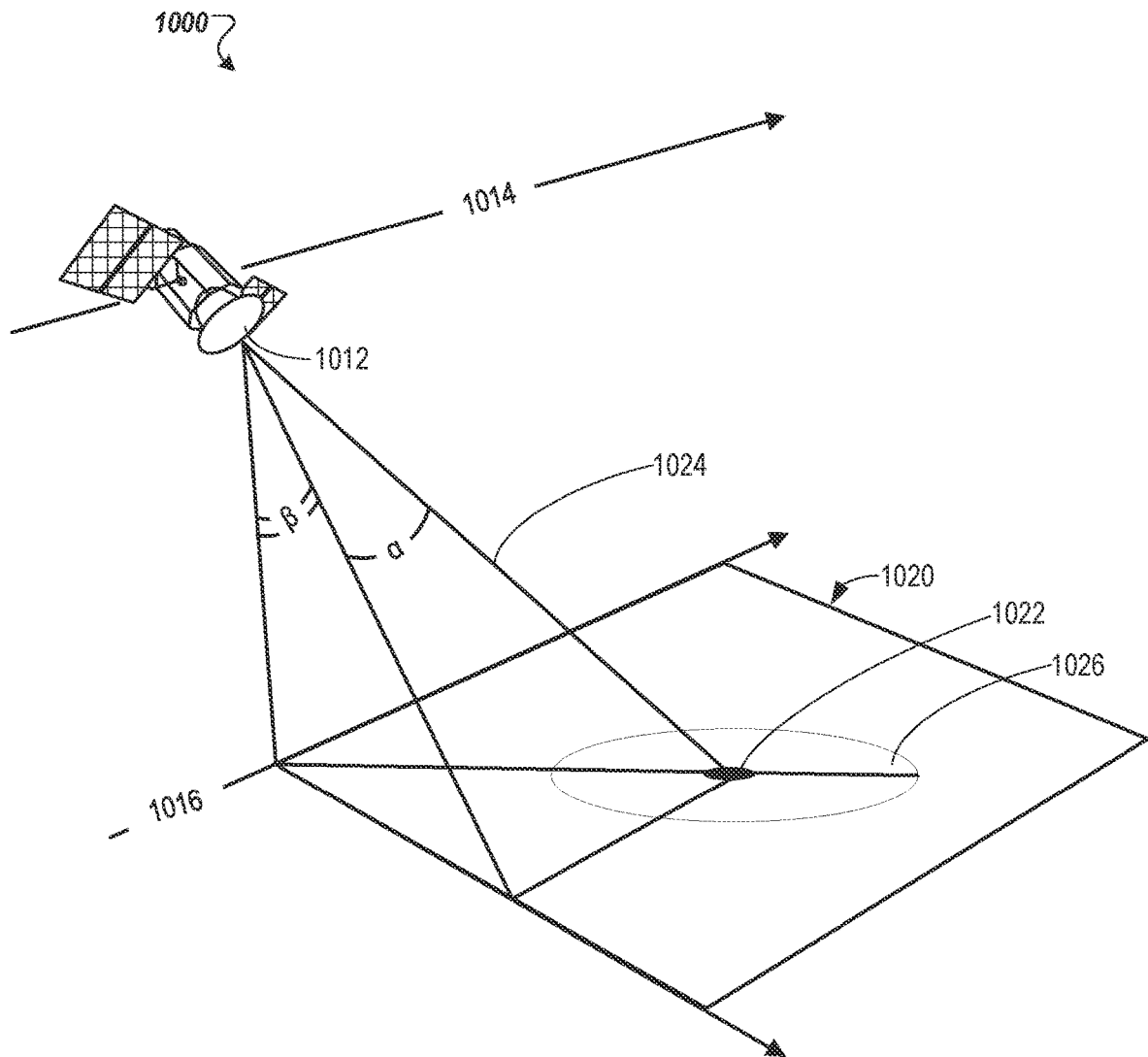
FIG. 10 illustrates a satellite including an antenna system that is steerable, according to embodiments of the present disclosure.

FIG. 10 illustrates the satellite 1000 including an antenna system 1012 that is steerable according to embodiments of the present disclosure. The satellite 1000 can include the communication system 100 or communication device 200 of FIGS. 1 and 2, as well as other array antennas and Tx DBF devices, as described herein. The antenna system 1012 may include multiple antenna elements that form an antenna and that can be mechanically or electrically steered individually, collectively, or a combination thereof. In an example, the antenna is a phased array antenna.

In orbit 804, the satellite 1000 follows a path 1014, the projection of which onto the surface of the Earth forms a ground path 1016. In the example illustrated in FIG. 10, the ground path 1016 and a projected axis extending orthogonally from the ground path 1016 at the position of the satellite 1000, together define a region 1020 of the surface of the Earth. In this example, the satellite 1000 can establish uplink and downlink communications with one or more of ground stations, user terminals, or other devices within the region 1020. In some embodiments, the region 1020 may be located in a different relative position to the ground path 1016 and the position of the satellite 1000. For example, the region 1020 may describe a region of the surface of the Earth directly below the satellite 1000. Furthermore, embodiments may include communications between the satellite 1000, an airborne communications system, and so forth.

As shown in FIG. 10, a communication target 1022 (e.g., a ground station, a user terminal, or a CT (such as an HD CT)) is located within the region 1020. The satellite 1000 controls the antenna system 1012 to steer transmission and reception of communications signals to selectively communicate with the communication target 1022. For example, in a downlink transmission from the satellite 1000 to the communication target 1022, a signal beam 1024 emitted by the antenna system 1012 is steerable within an area 1026 of the region 1020. In some implementations, the signal beam 1024 may include multiple subbeams. The extents of the area 1026 define an angular range within which the signal beam 1024 is steerable, where the direction of the signal beam 1024 is described by a beam angle "α" relative to a surface normal vector of the antenna system 1012. In two-dimensional phased array antennas, the signal beam 1024 is steerable in two dimensions, described in FIG. 15 by a second angle "β" orthogonal to the beam angle α. In this way, the area 1026 is a two-dimensional area within the region 1020, rather than a linear track at a fixed angle determined by the orientation of the antenna system 1012 relative to the ground path 1016.

In FIG. 10, as the satellite 1000 follows the path 1014, the area 1026 tracks along the surface of the Earth. In this way, the communication target 1022, which is shown centered in the area 1026 for clarity, is within the angular range of the antenna system 1012 for a period of time. During that time, signals communicated between the satellite 1000 and the communication target 1022 are subject to bandwidth constraints, including but not limited to signal strength and calibration of the signal beam 1024. In an example, for phased array antenna systems, the signal beam 1024 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 11:
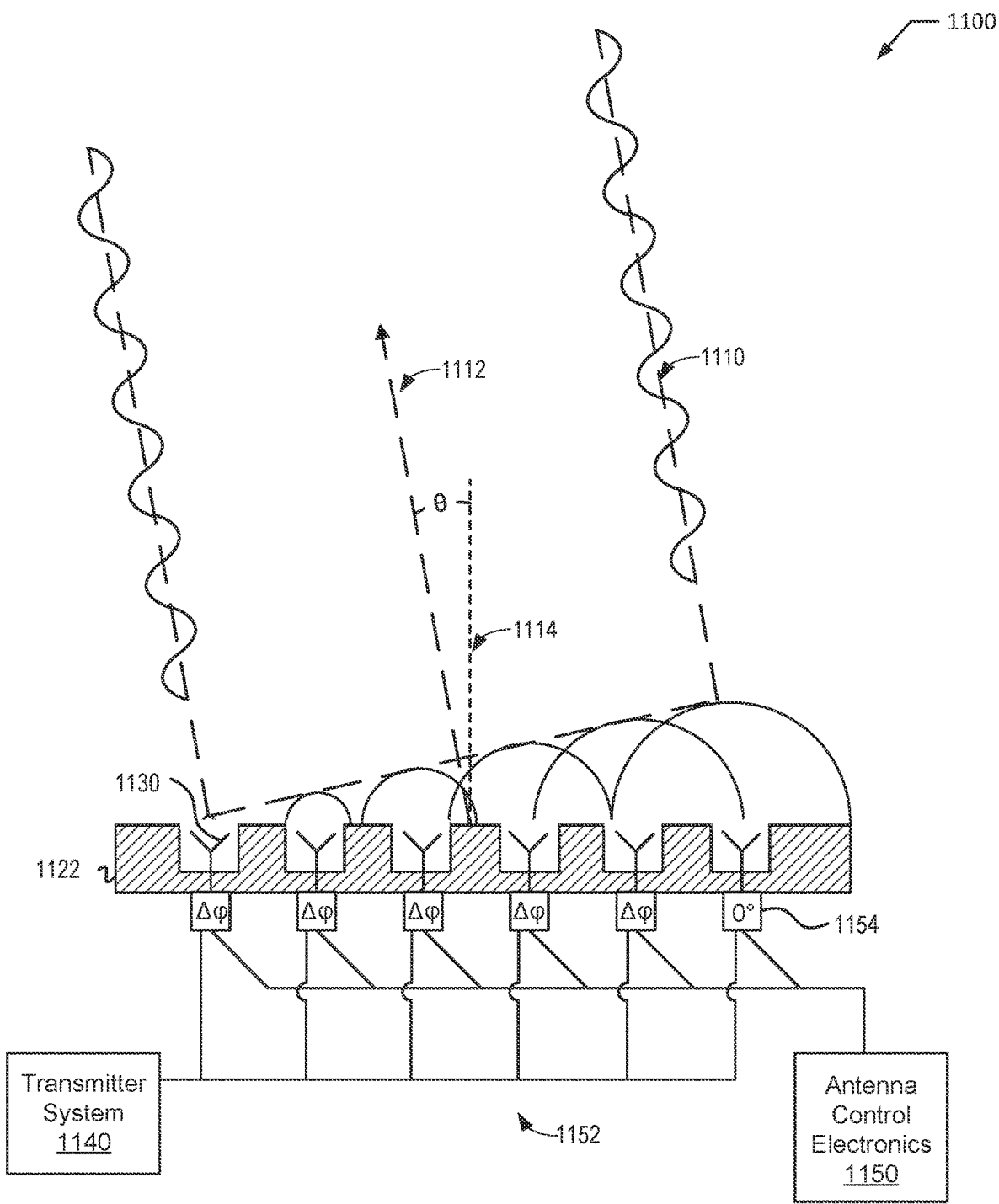
FIG. 11 illustrates a simplified schematic of an antenna, according to embodiments of the present disclosure.

FIG. 11 illustrates a simplified schematic of an antenna 1100, according to embodiments of the present disclosure. The antenna 1100 may be a component of the antenna system 1012 of FIG. 10. As illustrated, the antenna 1100 is a phased array antenna that includes multiple antenna elements 1130 (e.g., antenna elements 148 in FIG. 1). Interference between the antenna elements 1130 forms a directional radiation pattern in both transmitter and receiver arrays, forming a beam 1110 (beam extents shown as dashed lines). The beam 1110 is a portion of a larger transmission pattern (not shown) that extends beyond the immediate vicinity of the antenna 1100. The beam 1110 is directed along a beam vector 1112, described by an angle "θ" relative to an axis 1114 normal to a surface of the antenna 1100. As described below, the beam 1110 is one or more of steerable or shapeable through control of operating parameters including, but not limited to, a phase and an amplitude of each antenna element 1130.

In FIG. 11, the antenna 1100 includes, within a transmitter section 1122, the antenna elements 1130, which may include, but are not limited to, omnidirectional transmitter antennas coupled to a transmitter system 1140, such as the downlink transmitter 1478. The transmitter system 1140 provides a signal, such as a downlink signal to be transmitted to a ground station on the surface. The downlink signal is provided to each antenna element 1130 as a time-varying signal that may include several multiplexed signals. To steer the beam 1110 relative to the axis 1114, the phased array antenna system 1100 includes antenna control electronics 1150 controlling a radio frequency (RF) feeding network 1152, including multiple signal conditioning components 1154 interposed between the antenna elements 1130 and the transmitter system 1140. The signal conditioning components 1154 introduce one or more of a phase modulation or an amplitude modulation (e.g., by phase shifters 216 in FIG. 2), as denoted by "Δφ" in FIG. 11, to the signal sent to the antenna elements 1130. As shown in FIG. 11, introducing a progressive phase modulation produces interference in the individual transmission of each antenna element 1130 that generates the beam 1110.

The phase modulation imposed on each antenna element 1130 can differ and can be dependent on a spatial location of a communication target that determines an optimum beam vector (e.g., where the beam vector 1112 is found by one or more of maximizing signal intensity or connection strength). The optimum beam vector may change with time as the communication target 1022 moves relative to the phased array antenna system 1100.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A user terminal (UT), comprising:
an array antenna;
beamforming circuitry coupled to the array antenna;
a processing device coupled to the beamforming circuitry, wherein the processing device:
    receives a first RF signal via the beamforming circuitry, wherein the beamforming circuitry is configured with a first antenna gain pattern with a first main lobe oriented along a first direction;
    determines a radio frequency (RF) interference condition based on the first RF signal, wherein the RF interference condition is associated with an interfering device disposed along a second direction;
    determines a second antenna gain pattern, wherein the second antenna gain pattern comprises a second main lobe oriented along the second direction;
    generates first data indicating a set of directions comprising the first direction and a set of coefficients, each coefficient of the set of coefficients being associated with one direction of the set of directions;
    determines, using the first data, a third antenna gain pattern using a first combination of (i) values of beamforming parameters of the first antenna gain pattern and (ii) values of beamforming parameters of the second antenna gain pattern, wherein the first combination corresponds to the first direction and wherein the third antenna gain pattern maximizes signal reception along the first direction and minimizes signal reception along the second direction; and
    receives a second RF signal, with the beamforming circuitry configured with the third antenna gain pattern.

2. The UT of claim 1, wherein the processing device further:
    causes the beamforming circuitry to direct the first main lobe along each of the set of directions;
    determines, for each of the set of directions, interference data corresponding to receipt of corresponding RF signals using antenna gain patterns with different complex scaled values of the second antenna gain pattern; and
    generates, based on the interference data, the set of coefficients.

3. The UT of claim 1, wherein the processing device further:
    causes the beamforming circuitry to direct the first main lobe along each of the set of directions;
    determines signal strength data associated with receipt of a corresponding RF signal for each direction of the set of directions; and
    determines the second direction based on the signal strength data.

4. A method, comprising:
receiving, by a first communication device having beamforming circuitry, an indication of a first direction, wherein a second communication device is located along the first direction;
determining, by the first communication device, that orienting a first main lobe of a first antenna gain pattern along the first direction results in an RF interference condition associated with a third communication device disposed along a second direction;
determining, by the first communication device, a second antenna gain pattern, wherein the second antenna gain pattern comprises a second main lobe oriented along the second direction;
determining, by the first communication device, a third antenna gain pattern using (i) the first antenna gain pattern and (ii) the second antenna gain pattern, wherein the third antenna gain pattern maximizes signal reception along the first direction and minimizes signal reception along the second direction; and
receiving, by the first communication device, an RF signal with the beamforming circuitry configured with the third antenna gain pattern.

5. The method of claim 4, wherein determining the third antenna gain pattern further comprises:
generating first data indicating a set of directions comprising the first direction and a set of values corresponding to each of the set of directions wherein the third antenna gain pattern is determined further using the first data.

6. The method of claim 5, further comprising:
causing, by the first communication device, the beamforming circuitry to orient the first main lobe along each of the set of directions;
determining, by the first communication device for the first direction, first interference data corresponding to receipt of corresponding RF signals using (i) a first value of the first antenna gain pattern with the first main lobe oriented in the first direction and (ii) different complex scaled values of the second antenna gain pattern;
determining, by the first communication device for a third direction of the set of directions, second interference data corresponding to receipt of corresponding RF signals using (i) a second value of the first antenna gain pattern with the first main lobe oriented in the second direction and (ii) different complex scaled values of the second antenna gain pattern; and
generating, by the first communication device based on the first and the second interference data, the set of values.

7. The method of claim 5, wherein each of the set of directions indicates an elevation angle and an azimuthal angle, each elevation angle and each azimuthal angle of the set of directions being relative to a bearing angle of an array antenna of the first communication device.

8. The method of claim 5, further comprising:
causing, by the first communication device, the beamforming circuitry to orient the first main lobe along each of the set of directions;
determining, by the first communication device, signal strength data associated with receipt of a corresponding RF signal for each direction of the set of directions; and
determining, by the first communication device, the second direction based on the signal strength data.

9. The method of claim 4, wherein:
at least a portion of the first RF signal corresponds to a fixed service transmission; and
the second communication device comprises an artificial satellite.

10. The method of claim 4, wherein a value of the third antenna gain pattern comprises a scaled additive combination of (i) a corresponding value of the first antenna gain pattern and (ii) a corresponding value of the second antenna gain pattern.

11. The method of claim 4, wherein the RF interference condition is further associated with a fourth communication device disposed along a third direction, the method further comprising:
determining, by the first communication device, a fourth antenna gain pattern of the beamforming circuitry, wherein the fourth antenna gain pattern comprises a fourth main lobe oriented along the third direction, wherein the third antenna gain pattern further uses the fourth antenna gain pattern and further minimizes signal reception along the third direction.

12. The method of claim 11, wherein a value of the third antenna gain pattern comprises a scaled additive combination of (i) a corresponding value of the first antenna gain pattern and (ii) a corresponding value of the second antenna gain pattern, and (iii) a corresponding value of the fourth antenna gain pattern.

13. A first communication device, comprising:
beamforming circuitry coupled to an array antenna;
a memory coupled to the beamforming circuitry; and
a controller coupled to the beamforming circuitry and the memory, wherein the controller:
receives an indication of a first direction, wherein a second communication device is located along the first direction;
determines that orienting a first main lobe of a first antenna gain pattern along the first direction results in an RF interference condition associated with a third communication device disposed along a second direction;
determines a second antenna gain pattern, wherein the second antenna gain pattern comprises a second main lobe oriented along the second direction;
determines a third antenna gain pattern using (i) the first antenna gain pattern and (ii) the second antenna gain pattern, wherein the third antenna gain pattern maximizes signal reception along the first direction and minimizes signal reception along the second direction; and
receives a first RF signal with the beamforming circuitry configured with the third antenna gain pattern.

14. The first communication device of claim 13, wherein to determine the third antenna gain pattern, the controller further:
generates first data indicating a set of directions comprising the first direction and a set of values corresponding to each of the set of directions, wherein the third antenna gain pattern is determined further using the first data.

15. The first communication device of claim 14, wherein the controller further:
causes the beamforming circuitry to orient the first main lobe along each of the set of directions;
determines, for the first direction, first interference data corresponding to receipt of corresponding RF signals using antenna gain patterns with different combinations of (i) a first value of the first antenna gain pattern with the first main lobe oriented in the first direction and (ii) different complex scaled values of the second antenna gain pattern;
determines, for a third direction of the set of directions, second interference data corresponding to receipt of corresponding RF signals using (i) a second value of the first antenna gain pattern with the first main lobe oriented in the second direction and (ii) complex scaled values of the second antenna gain pattern; and
generates, based on the first interference data and the second interference data, the set of values.

16. The first communication device of claim 14, wherein each of the set of directions indicates an elevation angle and an azimuthal angle, each elevation angle and each azimuthal angle of the set of directions being relative to a bearing angle of the array antenna.

17. The first communication device of claim 14, wherein the controller further:
causes the beamforming circuitry to orient the first main lobe along each of the set of directions;
determines signal strength data associated with receipt of a corresponding RF signal for each direction of the set of directions; and
determines the second direction based on the signal strength data.

18. The first communication device of claim 13, wherein:
at least a portion of the first RF signal corresponds to a fixed service transmission; and
the second communication device comprises an artificial satellite.

19. The first communication device of claim 13, wherein the RF interference condition is further associated with a fourth communication device disposed along a third direction, wherein the controller further:
determines a fourth antenna gain pattern, wherein the fourth antenna gain pattern comprises a fourth main lobe oriented along the third direction, wherein the third antenna gain pattern further uses the fourth antenna gain pattern and further minimizes signal reception along the third direction.

20. The first communication device of claim 19, wherein a value of the third antenna gain pattern comprises a scaled additive combination of (i) a corresponding value of the first antenna gain pattern and (ii) a corresponding value of the second antenna gain pattern, and (iii) a corresponding value of the fourth antenna gain pattern.

* * * * *